United States Patent
Hasegawa et al.

(10) Patent No.: US 9,367,066 B2
(45) Date of Patent: Jun. 14, 2016

(54) INVERTED PENDULUM TYPE VEHICLE

(71) Applicant: HONDA MOTOR CO., LTD., Tokyo (JP)

(72) Inventors: Makoto Hasegawa, Wako (JP); Shinichiro Kobashi, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 14/225,471

(22) Filed: Mar. 26, 2014

(65) Prior Publication Data

US 2014/0297124 A1    Oct. 2, 2014

(30) Foreign Application Priority Data

Mar. 29, 2013  (JP) ................. 2013-074052

(51) Int. Cl.
| | | |
|---|---|---|
| *G05D 1/00* | (2006.01) | |
| *G05D 1/02* | (2006.01) | |
| *B62K 3/00* | (2006.01) | |
| *B62H 1/12* | (2006.01) | |

(52) U.S. Cl.
CPC ............... *G05D 1/0268* (2013.01); *B62H 1/12* (2013.01); *B62K 3/007* (2013.01); *B62K 2207/04* (2013.01)

(58) Field of Classification Search
CPC ........................ B62K 3/007; B62K 2207/04
USPC ......... 701/70, 124, 37–40; 180/282, 7.1, 316, 180/315, 328
See application file for complete search history.

(56) References Cited

U.S. PATENT DOCUMENTS

| | | | |
|---|---|---|---|
| 5,385,210 A | | 1/1995 | Harvey |
| 5,791,425 A | * | 8/1998 | Kamen ............ A61G 5/04 180/21 |
| 5,971,091 A | | 10/1999 | Kamen et al. |
| 6,302,230 B1 | | 10/2001 | Kamen et al. |

(Continued)

FOREIGN PATENT DOCUMENTS

| | | |
|---|---|---|
| DE | 20 2007 007 673 U1 | 10/2007 |
| EP | 1 529 556 A2 | 5/2005 |

(Continued)

OTHER PUBLICATIONS

European Office Communication for European Application No. 14161447.9, dated Jul. 23, 2015.

(Continued)

*Primary Examiner* — Thomas G Black
*Assistant Examiner* — Sara Lewandroski
(74) *Attorney, Agent, or Firm* — Birch, Stewart, Kolasch & Birch, LLP

(57) ABSTRACT

An inverted pendulum type vehicle capable of dissipating the dissociation of vehicle steering intention of a user and a vehicle motion condition. When a base tilts toward a first designated direction, gravity center shift effect amount $Vofs\_x$ is corrected by a gravity center shift correction amount $Vdep\_x$ calculated according to the tilting amount. The gravity center shift correction amount $Vdep\_x$ with respect to a second designated direction is determined so as to increase as the tilting amount toward the first designated direction of the base. Further, the gravity center shift effect amount $Vdep\_x$ determined by tilting toward the first designated direction of the base is controlled to a threshold value or less.

18 Claims, 10 Drawing Sheets

(56) References Cited

U.S. PATENT DOCUMENTS

| | | | |
|---|---|---|---|
| 6,827,163 B2* | 12/2004 | Amsbury | B60L 11/1851 180/218 |
| 6,840,346 B2 | 1/2005 | Sugitani et al. | |
| 7,690,452 B2 | 4/2010 | Kamen et al. | |
| 7,740,099 B2 | 6/2010 | Field et al. | |
| 7,963,352 B2 | 6/2011 | Alexander | |
| 8,050,837 B2 | 11/2011 | Yamada | |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 | 9/2013 | Gomi et al. | |
| 8,583,302 B2 | 11/2013 | Akimoto et al. | |
| 8,751,110 B2 | 6/2014 | Takenaka et al. | |
| 8,758,191 B2 | 6/2014 | Takenaka et al. | |
| 9,037,331 B2* | 5/2015 | Taira | B62K 3/007 180/6.28 |
| 9,085,334 B2 | 7/2015 | Hoffmann et al. | |
| 2001/0032743 A1* | 10/2001 | Kamen | A63C 17/12 180/7.1 |
| 2002/0023787 A1 | 2/2002 | Kamen et al. | |
| 2004/0069543 A1 | 4/2004 | Kamen et al. | |
| 2004/0201271 A1 | 10/2004 | Kakinuma et al. | |
| 2005/0121238 A1 | 6/2005 | Ishii | |
| 2005/0121866 A1* | 6/2005 | Kamen | A63C 17/01 280/47.18 |
| 2005/0126833 A1 | 6/2005 | Takenaka et al. | |
| 2007/0084662 A1 | 4/2007 | Oikawa | |
| 2007/0158117 A1* | 7/2007 | Alexander | B62K 3/007 180/21 |
| 2007/0251735 A1 | 11/2007 | Kakinuma et al. | |
| 2007/0296170 A1* | 12/2007 | Field | A63C 17/01 280/47.131 |
| 2008/0161990 A1* | 7/2008 | Gansler | B60W 40/11 701/38 |
| 2008/0245594 A1 | 10/2008 | Ishii et al. | |
| 2008/0271938 A1* | 11/2008 | Gulak | B62D 37/00 180/220 |
| 2009/0055033 A1* | 2/2009 | Gansler | G05D 1/0891 701/1 |
| 2009/0105908 A1* | 4/2009 | Casey | A63C 17/12 701/41 |
| 2009/0288900 A1* | 11/2009 | Takenaka | B62K 3/007 180/218 |
| 2010/0017069 A1 | 1/2010 | Miki et al. | |
| 2010/0030440 A1* | 2/2010 | Kosaka | B62K 3/007 701/70 |
| 2010/0030441 A1* | 2/2010 | Kosaka | B62K 3/007 701/70 |
| 2010/0030442 A1* | 2/2010 | Kosaka | G05D 1/0891 701/70 |
| 2010/0038960 A1 | 2/2010 | Takenaka et al. | |
| 2010/0070132 A1 | 3/2010 | Doi | |
| 2010/0071984 A1* | 3/2010 | Doi | B62K 3/007 180/218 |
| 2010/0096905 A1 | 4/2010 | Takenaka et al. | |
| 2010/0114420 A1 | 5/2010 | Doi | |
| 2010/0114421 A1 | 5/2010 | Doi | |
| 2010/0114468 A1* | 5/2010 | Field | B60N 2/045 701/124 |
| 2010/0152987 A1* | 6/2010 | Gorai | A61G 5/04 701/70 |
| 2010/0168993 A1 | 7/2010 | Doi et al. | |
| 2010/0235028 A1 | 9/2010 | Ishii | |
| 2010/0299044 A1* | 11/2010 | Miyake | B62K 3/007 701/96 |
| 2011/0006498 A1 | 1/2011 | Mercier | B62D 9/02 280/124.103 |
| 2011/0010066 A1* | 1/2011 | Fuwa | B62K 3/007 701/70 |
| 2011/0035101 A1 | 2/2011 | Kawada et al. | |
| 2011/0060518 A1* | 3/2011 | Kosaka | B62K 3/007 701/124 |
| 2011/0067936 A1* | 3/2011 | Takenaka | B62K 1/00 180/21 |
| 2011/0070998 A1 | 3/2011 | Takenaka et al. | |
| 2011/0071714 A1 | 3/2011 | Takenaka | |
| 2011/0071715 A1* | 3/2011 | Akimoto | B60L 15/20 701/22 |
| 2011/0071752 A1* | 3/2011 | Takenaka | B60L 15/10 701/124 |
| 2011/0098884 A1 | 4/2011 | Doi | |
| 2011/0118968 A1 | 5/2011 | Takenaka et al. | |
| 2011/0130925 A1 | 6/2011 | Oikawa | |
| 2011/0166713 A1 | 7/2011 | Tsuji et al. | |
| 2011/0209929 A1 | 9/2011 | Heinzmann et al. | |
| 2011/0209932 A1* | 9/2011 | Takenaka | B60B 19/003 180/15 |
| 2011/0213522 A1* | 9/2011 | Stevens | B62J 17/08 701/22 |
| 2011/0233989 A1* | 9/2011 | Takenaka | B60B 19/003 301/5.23 |
| 2011/0264350 A1 | 10/2011 | Doi | |
| 2012/0046856 A1 | 2/2012 | Doi | |
| 2012/0123647 A1 | 5/2012 | Doi et al. | |
| 2012/0166048 A1 | 6/2012 | Inoue et al. | |
| 2012/0173041 A1* | 7/2012 | Takenaka | B62J 1/005 701/1 |
| 2012/0173042 A1 | 7/2012 | Takenaka et al. | |
| 2012/0173086 A1 | 7/2012 | Takenaka et al. | |
| 2012/0217072 A1 | 8/2012 | Hoffmann et al. | |
| 2012/0232757 A1* | 9/2012 | Oikawa | B60L 15/2036 701/41 |
| 2013/0133959 A1 | 5/2013 | Kamiyama et al. | |
| 2013/0299254 A1 | 11/2013 | Mutoh et al. | |
| 2013/0299263 A1 | 11/2013 | Shimizu et al. | |
| 2014/0188338 A1 | 7/2014 | Ito et al. | |
| 2014/0236426 A1* | 8/2014 | Kosaka | B62K 3/007 701/41 |
| 2014/0330507 A1* | 11/2014 | Oikawa | B62K 3/007 701/124 |

FOREIGN PATENT DOCUMENTS

| | | |
|---|---|---|
| EP | 1 632 428 A1 | 3/2006 |
| EP | 2 045 180 A1 | 4/2009 |
| EP | 2 052 924 A1 | 4/2009 |
| EP | 2 163 467 A1 | 3/2010 |
| EP | 2 319 750 A1 | 5/2011 |
| GB | 224173 A | 9/1991 |
| JP | 2004/129435 A | 4/2004 |
| JP | 4181113 B2 | 11/2008 |
| JP | 2010-167807 A | 8/2010 |
| JP | 2010-167808 A | 8/2010 |
| JP | 2011-57111 A | 3/2011 |
| JP | 2011/063183 A | 3/2011 |
| JP | 2011-63183 A | 3/2011 |
| JP | 2011-63241 A | 3/2011 |
| JP | 2011-63243 A | 3/2011 |
| JP | 2011-68222 A | 4/2011 |
| TW | M424290 U1 | 3/2011 |
| WO | WO 02/30730 A2 | 4/2002 |
| WO | WO 2008/132778 A1 | 11/2008 |
| WO | WO 2008/132779 A1 | 11/2008 |
| WO | WO 2010/113439 A1 | 10/2010 |
| WO | WO 2011/033575 A1 | 3/2011 |
| WO | WO 2012/017335 A1 | 2/2012 |

OTHER PUBLICATIONS

Al-Hadithi et al., "Fuzzy Optimal Control for Double Inverted Pendulum", 7th IEEE Conference on Industrial Electronics and Applications (ICIEA), 2012, pp. 1-5.

Chen, "Analysis and Design of Robust Feedback Control Systems for a Nonlinear Two-Wheel Inverted Pendulum System", 2012 International Symposium on Computer, Consumer and Control, IEEE, 2012, 1 page (abstract only).

Ghorbani et al., "Fault tolerant improvement with chaos synchronization using Fuzzy-PID control", 13th Iranian Conference on Fuzzy Systems (IFSC), IEEE, 2013, 5 pages.

(56) References Cited

OTHER PUBLICATIONS

Jiang et al., "High Gain Disturbance Observer and Its Application in Robust Control Attenuation", Proceeding of the IEEE International Conference on Information and Automation, IEEE, Aug. 2013, pp. 230-235.

Lee et al., "Application of Dynamic Inversion with Extended High-Gain Observers to Inverted Pendulum on a Cart", 2013 American Control Conference (ACC), Jun. 17-19, 2013, AACC, 4234-4238.

Phaoharuhansa et al., "Trajectory Tracking for Wheeled Inverted Pendulum Robot using Tilt Angle Control", IEEE, 2013, pp. 4288-4293.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and Its Application", Proceedings of 2014 IEEE International Conference on Mechatronics and Automation, Aug. 3-6, 2014, pp. 1745-1750.

U.S. Notice of Allowance, issued Feb. 25, 2015, for U.S. Appl. No. 14/273,075.

U.S. Office Action, issued Feb. 24, 2015, for U.S. Appl. No. 14/223,360.

U.S. Office Action for U.S. Appl. No. 14/223,360, dated Sep. 3, 2015.

U.S. Office Action, dated Jan. 25, 2016, for U.S. Appl. No. 14/244,279.

Notice of Allowance dated Feb. 2, 2016 issued in related U.S. Appl. No. 14/225,777.

U.S. Office Action, dated Oct. 5, 2015, for U.S. Appl. No. 14/225,777.

U.S. Office Action, dated Oct. 7, 2015, for U.S. Appl. No. 14/225,489.

U.S. Office Action, dated Oct. 9, 2015, for U.S. Appl. No. 14/246,846.

Extended European Search Report for Application 14169797.9 dated Oct. 7, 2014.

Extended European Search Report for Application 14169800.1 dated Oct. 7, 2014.

U.S. Appl. No. 14/225,489, filed Mar. 26, 2014.
U.S. Appl. No. 14/225,593, filed Mar. 26, 2014.
U.S. Appl. No. 14/225,777, filed Mar. 26, 2014.
U.S. Appl. No. 14/225,564, filed Mar. 26, 2014.
U.S. Appl. No. 14/223,360, filed Mar. 24, 2014.
U.S. Appl. No. 14/246,846, filed Apr. 7, 2014.
U.S. Appl. No. 14/244,279, filed Apr. 3, 2014.
U.S. Appl. No. 14/273,075, filed May 8, 2014.

* cited by examiner

INVERTED PENDULUM TYPE VEHICLE

CROSS-REFERENCE TO RELATED APPLICATION

The present application claims priority under 35 U.S.C. §119 to Japanese Patent Application No. 2013-074052, filed Mar. 29, 2013. The entire contents of the above-identified application is hereby incorporated by reference.

BACKGROUND OF THE INVENTION

1. Field of the Invention

The present invention relates to an inverted pendulum type vehicle configured to be capable of moving in all directions on a floor surface.

2. Description of Background Art

A technology for suppressing increase of the translational speed of a vehicle by subjecting the translational speed command to limiting processing has been proposed in JP-A No. 2011-063183.

However, depending on a value of a gain at the time of feedback-control of the motion of the vehicle, the translational speed of the vehicle cannot be made within a limit range, and the vehicle may be translated and the like in a form not expected by a user.

SUMMARY AND OBJECTS OF THE INVENTION

The object of the present invention is to provide an inverted pendulum type vehicle capable of dissipating the dissociation of vehicle steering intention of a user and a vehicle motion condition.

The present invention relates to an inverted pendulum type vehicle (may be hereinafter simply referred to as a "vehicle") that includes moving motion units configured to be capable of moving in all directions on a floor surface, actuator devices that drive the moving motion units, a base that incorporates the moving motion units and the actuator devices, an occupant riding section incorporated into the base so as to be tiltable with respect to the vertical direction (e.g.: tiltable with respect to an imaginary line that extends orthogonally with respect to the floor surface), a tilting state detection unit that detects the tilting state of the occupant riding section, and a control device configured to control the motion of the actuator devices based on a detection result of the tilting state of the occupant riding section by the tilting state detection unit.

The control device is configured to control the motion of the actuator devices so that the vehicle is translated in a second designated direction that is the opposite direction of a first designated direction of the occupant riding section at a speed determined based on the tilting condition toward the first designated direction.

According to the vehicle of the present invention, the translational speed of the vehicle toward the second designated direction that is the opposite direction of the first designated direction can be superimposed by the speed determined based on the tilting condition toward the first designated direction of the occupant riding section. When the first designate direction is the rearward direction of the occupant, if the body weight has been moved rearward, in the inverted pendulum type vehicle, the vehicle itself is tilted forward by being translated toward the first designated direction so as to maintain the position of the occupant at the present position in a balanced manner, and therefore the vehicle may possibly be translated rearward as it is as a result. However, because the velocity component toward the second designated direction can be superimposed based on the speed toward the first designated direction, such an effect is exerted that to maintain the vehicle in the current state can be expected because the component allowing movement toward the first designated direction and the component allowing movement toward the second designated direction are offset.

In the vehicle of the present invention, it is preferable that the control device is configured to determine a basic translation command value of the vehicle toward the tilting direction of the occupant riding section based on the tilting condition of the occupant riding section, to determine a translation command correction amount toward the second designated direction of the vehicle based on the tilting condition toward the first designated direction of the occupant riding section, and to determine the translational speed of the vehicle based on a result obtained by correcting the basic translation command value according to the translation command correction amount.

According to the vehicle of the configuration, because the translation command correction amount toward the second designated direction is determined according to the tilting condition toward the first designated direction and the translational speed of the vehicle is determined based on the result obtained by correcting the basic command value according to the translation command correction amount, it is more likely that limiting control responding to the tilting state of the vehicle becomes possible (the vehicle can continue to stay at the current position in the case of rearward movement).

In the vehicle of the present invention, it is preferable that the control device is configured to determine the translation command correction amount so that the translation command correction amount of the vehicle with respect to the second designated direction continuously or intermittently increases as the tilting amount toward the first designated direction of the occupant riding section increases.

According to the vehicle of the configuration, because the translation command correction amount with respect to the second designated direction is configured to continuously or intermittently increase as the tilting amount toward the first designated direction increases, such an effect is exerted that it can be expected that the vehicle can continue to stay at the current position because, even if the tilting state toward the first designated direction increases, it is possible to superimpose the speed with respect to the second designated direction considering the condition.

In the vehicle of the present invention, it is preferable that the control device is configured to determine the translation command correction amount of the vehicle so that the increase rate of the translation command correction amount with respect to the second designated direction with respect to the tilting amount toward the first designated direction of the occupant riding section reduces.

According to the vehicle of the configuration, although the translation command correction amount gradually increases while the occupant riding section tilts to the first designated direction, an event that the translation command correction amount becomes excessively large due to reduction of the increase rate is avoided. Therefore, such event can be prevented or suppressed that the vehicle is translated to the second designated direction at such high speed that the user does not expect because the translation command correction amount is excessively large when the tilting direction of the occupant riding section shifts from the first designated direction to the second designated direction.

In the vehicle of the present invention, it is preferable that the control device is configured to determine the translation command correction amount of the vehicle so that the translation command correction amount with respect to the second designated direction reduces after completion of tilting of the occupant riding section toward the first designated direction.

According to the vehicle of the configuration, after the tilting direction of the occupant riding section shifts from the first designated direction to another direction such as the second designated direction, reduction of the translation command correction amount that remains at the time of shifting of the tilting direction is made quicker. As a result, the motion condition of the vehicle matching the intention of the user according to the tilting condition of the occupant riding section can be achieved quickly.

In the vehicle of the present invention, it is preferable that the control device is configured to adjust the reduction rate of the translation command correction amount based on the motion condition of the vehicle after completion of tilting of the occupant riding section toward the first designated direction.

According to the vehicle of the configuration, after the tilting direction of the occupant riding section shifts from the first designated direction to another direction such as the second designated direction, the reduction condition of the translation command correction amount that remains at the time of shifting of the tilting direction is adjusted according to the motion condition of the vehicle. As a result, an event that the translation command correction amount affects determination of the translational speed of the vehicle in an improper form in view of the motion condition of the vehicle is avoided, and consistency of the motion condition of the vehicle and the intention of the user can be achieved.

In the vehicle of the present invention, it is preferable that the control device is configured to adjust a reduction rate of the translation command correction amount so that the reduction rate continuously or intermittently increases as the translational speed or the turning speed of the vehicle increases after completion of tilting of the occupant riding section toward the first designated direction.

According to the vehicle of the configuration, such an event can be avoided that, even if probability that the vehicle is in motion under a condition matching the intention of the user is high, the translation command correction amount affects the motion condition of the vehicle in view of the vehicle steering intention of the user.

In the vehicle of the present invention, it is preferable that the control device is configured to determine the translation command correction amount of the vehicle so that the translation command correction amount with respect to the second designated direction becomes a threshold value or less.

According to the vehicle of the configuration, such an event that the basic translation command value toward the first designated direction is excessively corrected even if probability that the user intends to translate the vehicle toward the first designated direction in view of the tilting condition of the occupant riding section is high is avoided, and therefore the translation can be allowed.

In the vehicle of the present invention, it is preferable that the control device is configured to determine the translational speed of the vehicle by subjecting a result obtained by correcting the basic translation command value according to the translation command correction amount to multi-stage limiting processing having a dead zone.

According to the vehicle of the configuration, the event that the result obtained by correcting the basic translation command value according to the translation command correction amount becomes unstable and the vehicle is translated in an unexpected form can be avoided more securely.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 (b) is a block diagram showing processing of an essential part of the second control processing unit in the third embodiment of the present invention;

FIG. 10 (b) is an explanatory drawing in relation with the second example of gravity center target speed determination processing;

FIG. 11 (b) is an explanatory drawing in relation with the second example of the vehicle motion.

DETAILED DESCRIPTION OF THE PREFERRED EMBODIMENTS

First Embodiment

Figure 1:
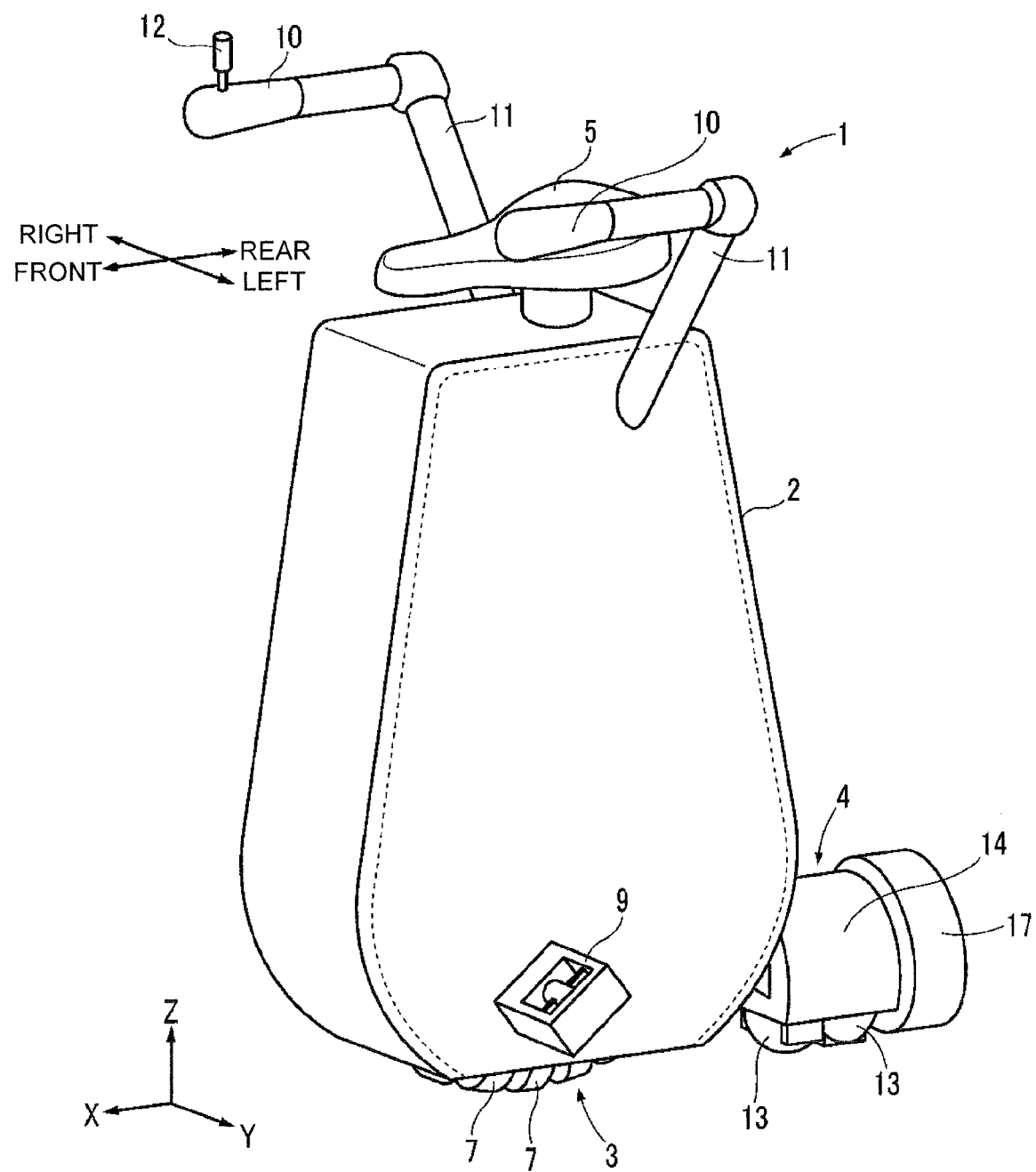
FIG. 1 is a perspective view of the outer appearance of the inverted pendulum type vehicle of the first embodiment of the present invention.
Figure 2:
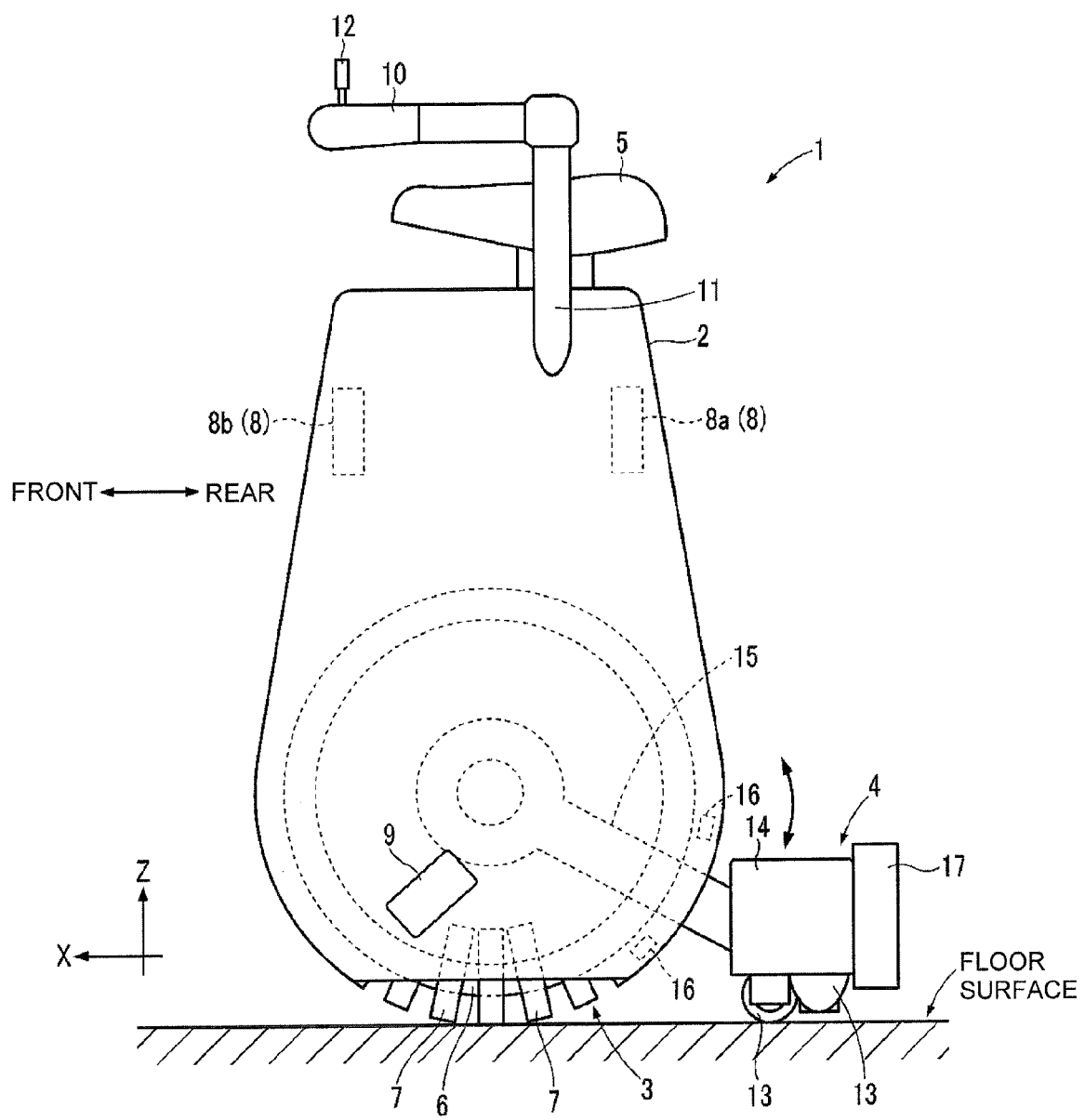
FIG. 2 is a side view of the inverted pendulum type vehicle of the first embodiment.

The first embodiment of the present invention will be described referring to FIG. 1-FIG. 8, FIG. 10, and FIG. 11. As shown in FIG. 1 and FIG. 2, an inverted pendulum type vehicle 1 of the present embodiment includes a base 2, a first moving motion unit 3 and a second moving motion unit 4 capable of moving on a floor surface, and an occupant riding section 5 on which an occupant rides.

The first moving motion unit 3 includes a core body 6 of an annular shape shown in FIG. 2 (hereinafter referred to as an annular core body 6), and plural rollers 7 of an annular shape mounted on the annular core body 6 so as to be arrayed at equal angular intervals in the circumferential direction (the direction around the axis) of the annular core body 6. The respective rollers 7 are externally inserted to the annular core body 6 with their rotation axes being directed to the circumferential direction of the annular core body 6. Also, the respective rollers 7 are made rotatable integrally with the annular core body 6 around the axis of the annular core body 6, and are made rotatable around the axis of the cross section of the annular core body 6 (the circumferential axis around the axis of the annular core body 6).

The first moving motion unit 3 including these annular core body 6 and plural rollers 7 is grounded on the floor surface through the roller 7 (the roller 7 positioned at the lower part of the annular core body 6) in a state where the axis of the annular core body 6 is directed parallel to the floor surface. It is configured that, by rotationally driving the annular core body 6 around the axis thereof in this grounded state, the annular core body 6 and all of the respective rollers 7 roll, and thereby the first moving motion unit 3 moves on the floor surface to the direction orthogonal to the axis of the annular core body 6. Also, it is configured that, by rotationally driving the respective rollers 7 around the rotational axes thereof in the grounded state, the first moving motion unit 3 moves to the axial direction of the annular core body 6.

Further, it is configured that, by executing rotational drive of the annular core body 6 and rotational drive of the respective rollers 7, the first moving motion unit 3 moves to the direction orthogonal to the axis of the annular core body 6 and the direction inclined with respect to the axial direction of the annular core body 6.

Thus, the first moving motion unit 3 can move to all direction on the floor surface. In the description below, as shown in FIG. 1 and FIG. 2, out of the moving directions of the first moving motion unit 3, the direction orthogonal to the axis of the annular core body 6 is made the X-axis direction, the axial direction of the annular core body 6 is made the Y-axis direction, and the vertical direction is made the Z-axis direction. Also, the forward direction is made the positive direction of X-axis, the leftward direction is made the positive direction of Y-axis, and the upward direction is made the positive direction of Z-axis.

The first moving motion unit 3 is incorporated into the base 2. More specifically, the base 2 is arranged so as to cover the periphery of a portion excluding the lower part of the first moving motion unit 3 grounded on the floor surface. Also, the annular core body 6 of the first moving motion unit 3 is supported by the base 2 so as to be rotatable around the axis thereof.

In this case, the base 2 is made tiltable around the axis of the annular core body 6 of the first moving motion unit 3 (around Y-axis) with the axis of the annular core body 6 of the first moving motion unit 3 being a fulcrum, and is made tiltable around X-axis orthogonal to the axis of the annular core body 6 with the grounding part of the first moving motion unit 3 being a fulcrum by being tilted with respect to the floor surfaced along with the first moving motion unit 3. Therefore, the base 2 is tiltable around two axes with respect to the vertical direction.

Also, inside the base 2, as shown in FIG. 2, a first actuator device 8 that generates a drive force for moving the first moving motion unit 3 is mounted. The first actuator device 8 is formed of an electric motor 8a as an actuator rotationally driving the annular core body 6 and an electric motor 8b as an actuator rotationally driving the respective rollers 7. Further, it is configured that the electric motors 8a, 8b impart rotational drive force to the annular core body 6 and the respective rollers 7 through power transmission mechanisms whose illustrations are omitted. Also, the power transmission mechanisms may have a known structure.

The first moving motion unit 3 may have a structure different from the structure described above. For example, as the structure of the first moving motion unit 3 and the drive system thereof, those having a structure proposed by the present applicant in PCT Unexamined International Application WO/2008/132778 or PCT Unexamined International Application WO/2008/132779 may be employed.

Also, the occupant riding section 5 is incorporated into the base 2. The occupant riding section 5 is formed of a seat on which the occupant sits, and is fixed to the upper end of the base 2. Further, the occupant can sit on the occupant riding section 5 with the occupant's front/rear direction being directed to the X-axis direction and the occupant's right/left direction being directed to the Y-axis direction. Also, because the occupant riding section 5 (seat) is fixed to the base 2, it is made tiltable with respect to the vertical direction (e.g.: tiltable with respect to an imaginary line that extends orthogonally with respect to the floor surface) integrally with the base 2. That is, the tilting condition or the rotating condition (around the Yaw axis) of the occupant riding section 5 and the tilting condition or the rotating condition of the base 2 are measured as equivalent ones.

The first moving motion unit 3 and the base 2 may be configured so as not to be tilted around X-axis and Y-axis (so that the attitude in the pitching direction and the rolling direction is maintained generally constant). In this case, it may configured that the occupant riding section 5 is supported by the base 2 so as to be tiltable or rotatable through a ball joint and the like. That is, the tilting condition or the rotating condition of the occupant riding section 5 and the tilting condition or the rotating condition of the base 2 are measured as separate ones.

A pair of footrests 9, 9 on which the occupant sitting on the occupant riding section 5 places the occupant's feet and a pair of holders 10, 10 held by the occupant are further incorporated into the base 2.

The footrests 9, 9 are arranged projectingly in the lower part of both sides of the base 2. Also, in FIG. 1 and FIG. 2, illustration of the footrest 9 on one side (right side) is omitted.

Further, the holders 10, 10 are ones having a bar shape disposed so as to extend in the X-axis direction (front/rear direction) on both sides of the occupant riding section 5 and are respectively fixed to the base 2 through rods 11 extended from the base 2. Also, a joy stick 12 as an operation tool is attached to one holder 10 (the holder 10 on the right side in the drawing) out of the holders 10, 10.

The joy stick 12 is made swingably operable in the front/rear direction (X-axis direction) and the right/left direction (Y-axis direction). Also, the joy stick 12 outputs operation signals showing the swing amount thereof in the front/rear direction (X-axis direction) and the direction of the swing (forward or rearward) thereof as an advancing/retreating command that makes the vehicle 1 move forward or rearward, and outputs operation signals showing the swing amount in the right/left direction (Y-axis direction) and the direction of the swing (rightward or leftward) thereof as a transverse moving command that makes the vehicle 1 move in the right/left direction.

In the present embodiment, the second moving motion unit 4 is formed of a so-called omni-wheel. The omni-wheel as the second moving motion unit 4 has a known structure including a pair of coaxial annular core bodies (illustration thereof is omitted) and a plurality of barrel-like rollers 13 externally inserted so as to be rotatable with the rotation axis being directed to the circumferential direction of the annular core bodies in the respective annular core bodies.

In this case, the second moving motion unit 4 is disposed on the rear side of the first moving motion unit 3 with the axis of the pair of annular core bodies being directed to the X-axis direction (front/rear direction), and is grounded to the floor surface through the rollers 13.

The roller 13 on one side and the roller 13 on the other side of the pair of annular core bodies are disposed so as to shift the phase in the circumferential direction of the annular core bodies, and it is configured that either one of the roller 13 on one side and the roller 13 on the other side of the pair of annular core bodies is grounded to the floor surface when the pair of annular core bodies rotate.

The second moving motion unit 4 formed of the omni-wheel is connected to the base 2. More specifically, the second moving motion unit 4 includes a case 14 that covers a portion on the upper side of the omni-wheel (the entirety of the pair of annular core bodies and the plural rollers 13), and the pair of annular core bodies of the omni-wheel are journaled to the case 14 so as to be rotatable around the axis of the pair of annular core bodies. Also, an arm 15 extended from the case 14 to the base 2 side is journaled to the base 2 so as to be swingable around the axis of the annular core bodies 6 of the first moving motion unit 3. Thus, the second moving motion unit 4 is connected to the base 2 through the arm 15.

Also, the second moving motion unit 4 is made swingable with respect to the base 2 around the axis of the annular core bodies 6 of the first moving motion unit 3 by swinging of the arm 15, and thereby, the occupant riding section 5 is made capable of tiltable around Y-axis along with the base 2 while both of the first moving motion unit 3 and the second moving motion unit 4 are grounded.

It may be also configured that the arm 15 is journaled to the axis section of the annular core bodies 6 of the first moving motion unit 3 and the second moving motion unit 4 is connected to the first moving motion unit 3 through the arm 15.

Also, in the base 2, a pair of stoppers 16, 16 that restrict the swing range of the arm 15 is arranged, and the arm 15 can swing within a range between the stoppers 16, 16. Thus, it is configured that the swing range of the second moving motion unit 4 around the axis of the annular core bodies 6 of the first moving motion unit 3 as well as the swing range of the base 2 and the occupant riding section 5 around X-axis are restricted, and the base 2 and the occupant riding section 5 are prevented from tilting excessively to the rear side of the occupant.

The second moving motion unit 4 may be energized by a spring so as to be pressed to the floor surface.

As described above, similarly to the first moving motion unit 3, the second moving motion unit 4 can move on the floor surface in all direction including the X-axis direction and the Y-axis direction by executing either one or both of rotation of the pair of annular core bodies of the second moving motion unit 4 and rotation of the rollers 13. More specifically, the second moving motion unit 4 is made movable in the Y-axis direction (right/left direction) by rotation of the annular core bodies, and is made movable in the X-axis direction (front/rear direction) by rotation of the rollers 13.

Also, to the case 14 of the second moving motion unit 4, an electric motor 17 as the second actuator device that drives the second moving motion unit 4 is attached. So as to rotationally drive a pair of annular core bodies of the second moving motion unit 4, the electric motor 17 is connected to the pair of annular core bodies.

Therefore, in the present embodiment, it is configured that the second moving motion unit 4 is moved in the X-axis direction in a subordinate manner following the movement of the first moving motion unit 3 in the X-axis direction, and the second moving motion unit 4 is moved in the Y-axis direction by rotatingly driving the pair of annular core bodies of the second moving motion unit 4 by the electric motor 17.

In addition, the second moving motion unit 4 may have a structure similar to that of the first moving motion unit 3.

The above is the mechanical configuration of the vehicle 1 in the present embodiment.

Figure 3:
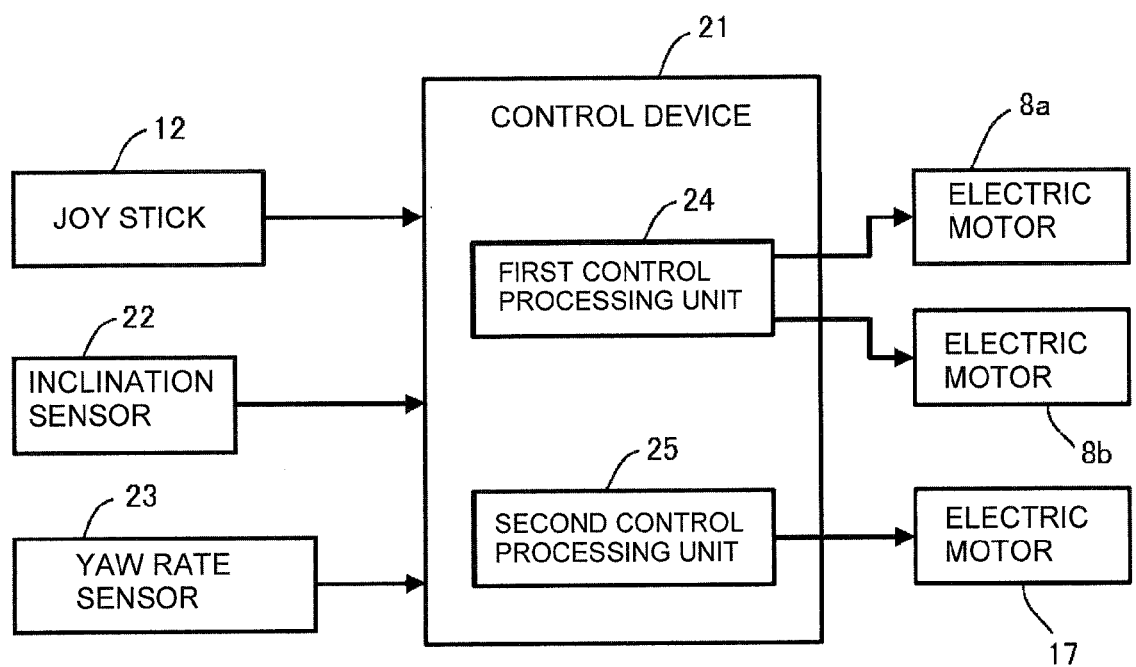
FIG. 3 is a block diagram showing a configuration for controlling the inverted pendulum type vehicle of the first embodiment.

Although illustration in FIG. 1 and FIG. 2 is omitted, on the base 2 of the vehicle 1 in the present embodiment, as a configuration for motion control of the vehicle 1 (motion control of the first moving motion unit 3 and the second moving motion unit 4), as shown in FIG. 3, a control device 21 formed of an electronic circuit unit including CPU, RAM, ROM and the like, an inclination sensor 22 for measuring the inclination angle of the occupant riding section 5 (the inclination angle of the base 2) with respect to the vertical direction, and a yaw rate sensor 23 for measuring the angular velocity around the yaw axis of the vehicle 1 are mounted.

Also, it is configured that the output of the joy stick 12 and the detection signals of the inclination sensor 22 and the yaw rate sensor 23 are inputted to the control device 21. The input signals are stored as the data in a storage device that forms the control device 21. The data stored by the storage device may be accumulated, but may be updated or overwritten for every inputting.

The control device 21 is configured to control the motion of the actuator devices 8a, 8b and 17 of the vehicle 1 according to the detection result of the inclination state of the base 2 expressed by the output signal of the inclination sensor 22 that forms the "inclination state detection unit".

"The control device 21 is "configured" to execute predetermined calculating process" means that the calculation processing device of one or plural CPUs and the like forming the control device 21 is "programmed" or "designed" so as to execute the predetermined calculation process or to output required signals according to the reading software after required application software and required data are read from the storage device such as ROM or RAM and the like.

Also, the control device 21 may be formed into plural electronic circuit units that are capable of communicating to each other.

The inclination sensor 22 is formed of an acceleration sensor and an angular velocity sensor such as a gyro-sensor and the like for example. Also, the control device 21 acquires the measured value of the inclination angle of the occupant riding section 5 (that is the inclination angle of the base 2) from the detection signals of these acceleration sensor and angular velocity sensor using a known method. As the method, a method described in Japanese Patent No. 4181113 may be employed for example.

Also, more specifically, the inclination angle of the occupant riding section 5 (or the inclination angle of the base 2) in the present embodiment is the inclination angle that makes the attitude of the occupant riding section 5 (or the base 2), in a state where the gravity center of the entirety including the vehicle 1 and the occupant riding on the occupant riding section 5 of the vehicle 1 with a predetermined attitude (standard attitude) is positioned just above (above in the vertical direction) of the grounding part of the first moving motion unit 3, a reference (zero) (a set of the inclination angle in the direction around X-axis and the inclination angle in the direction around Y-axis).

Further, the yaw rate sensor 23 is formed of an angular velocity sensor such as a gyro-sensor and the like. Also, the control device 21 acquires the measured value of the angular velocity around the yaw axis of the vehicle 1 based on the detection signal of the angular velocity sensor.

Further, the control device 21 includes a first control processing unit 24 controlling the moving motion of the first moving motion unit 3 by controlling the electric motors 8a, 8b that form the first actuator device 8 and a second control processing unit 25 controlling the moving motion of the second moving motion unit 4 by controlling the electric motor 17 as the second actuator device in addition to the function for acquiring the measured values as described above as a function achieved by a mounted program and the like (function achieved by software) or a function formed by hardware.

By executing the calculation process described below, the first control processing unit 24 calculates the first target speed that is a target value of the moving speed of the first moving motion unit 3 (more specifically, a set of the translational speed in the X-axis direction and the translational speed in the Y-axis direction) one by one, and controls the rotational speed of the electric motors 8a, 8b so that the actual moving speed of the first moving motion unit 3 agrees to the first target speed.

In this case, the relation between each rotational speed of the electric motors 8a, 8b and the actual moving speed of the first moving motion unit 3 is determined beforehand, and it is configured that the target value of the rotational speed of the electric motors 8a, 8b is decided according to the first target speed of the first moving motion unit 3. Also, by feedback-control of the rotational speed of the electric motors 8a, 8b to the target value decided according to the first target speed, the actual moving speed of the first moving motion unit 3 is controlled to the first target speed.

By executing the calculation processing described below, the second control processing unit 25 calculates the second target speed that is a target value of the moving speed of the second moving motion unit 4 (more specifically, the translational speed in the Y-axis direction) one by one, and controls the rotational speed of the electric motor 17 so that the actual moving speed of the second moving motion unit 4 in the Y-axis direction agrees to the second target speed.

In this case, similarly to the case of the first moving motion unit 3, the relation between the rotational speed of the electric motor 17 and the actual moving speed of the second moving motion unit 4 in the Y-axis direction is determined beforehand, and it is configured that the target value of the rotational speed of the electric motor 17 is decided according to the second target speed of the second moving motion unit 4. Also, by feedback-control of the rotational speed of the electric motor 17 to the target value decided according to the second target speed, the actual moving speed of the second moving motion unit 4 in the Y-axis direction is controlled to the second target speed.

In addition, in the present embodiment, the second moving motion unit 4 is moved in the X-axis direction in a subordinate manner following the movement of the first moving motion unit 3 in the X-axis direction. Therefore, it is not necessary to set the target value of the moving speed of the second moving motion unit 4 in the X-axis direction.

Next, processing of the first control processing unit 24 and the second control processing unit 25 will be described in more detail. First, processing of the first control processing unit 24 will be described referring to FIG. 4 to FIG. 7.

Figure 4:
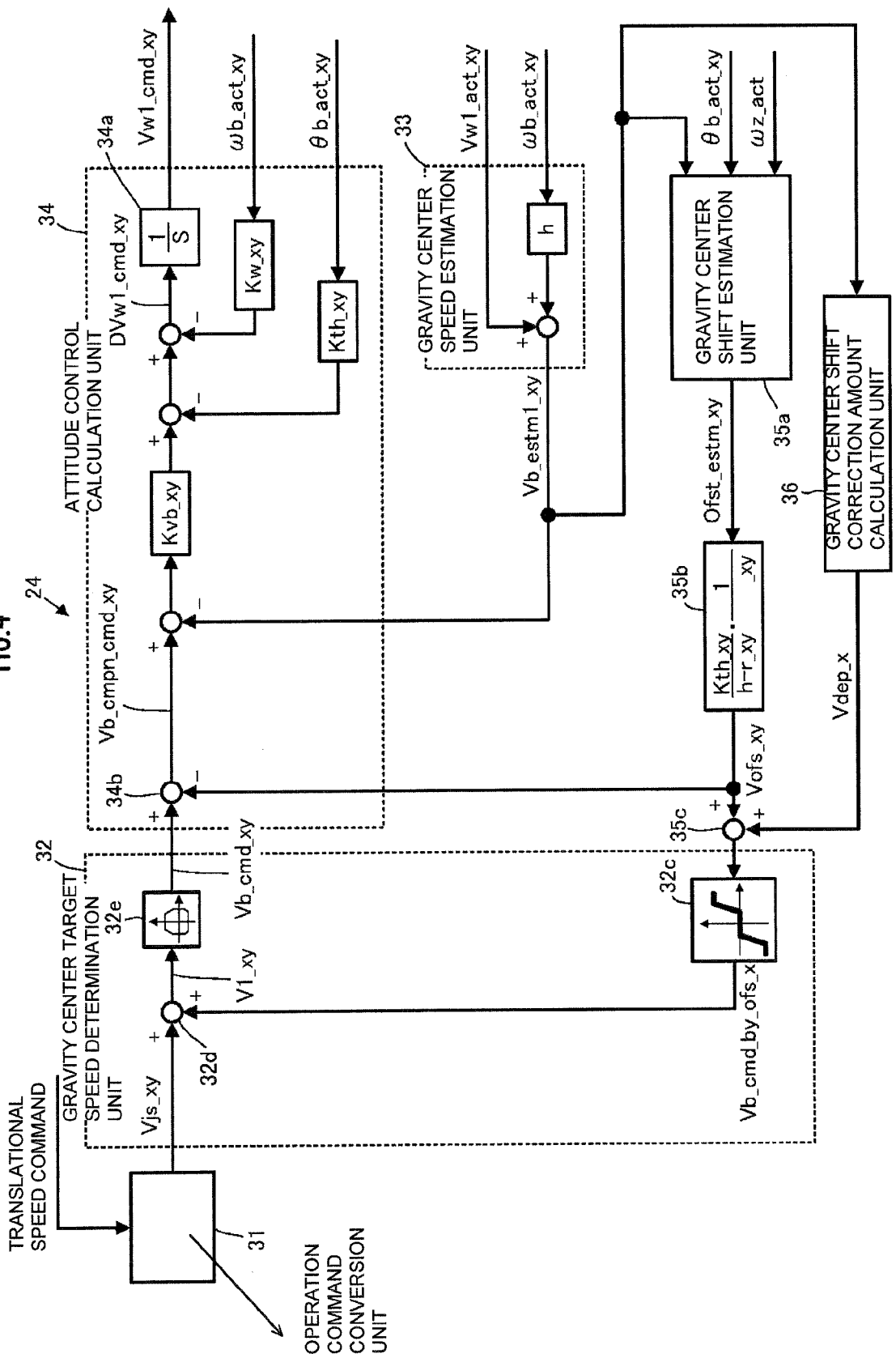
FIG. 4 is a block diagram showing processing of the first control processing unit shown in FIG. 3.

As shown in FIG. 4, the first control processing unit 24 includes, as main function units thereof, an operation command conversion unit 31 that converts the command inputted from the joy stick 12 (turning command and advancing/retreating command) to the speed command of the vehicle 1 in the X-axis direction (front/rear direction) and the Y-axis direction (right/left direction), a gravity center target speed determination unit 32 that determines the target speed of the gravity center of the entirety including the vehicle 1 and the occupant riding on the occupant riding section 5 thereof (hereinafter referred to as the vehicle system entirety gravity center), a gravity center speed estimation unit 33 that estimates the speed of the vehicle system entirety gravity center, and an attitude control calculation unit 34 that determines the target value of the moving speed of the first moving motion unit 3 so as to control the attitude of the occupant riding section 5 (the attitude of the base 2) while making the speed of the vehicle system entirety gravity center estimated follow the target speed. Also, the first control processing unit 24 executes processing of these respective function units at a predetermined calculation processing period of the control device 21.

Further, in the present embodiment, the vehicle system entirety gravity center has a meaning as an example of the representative point of the vehicle 1. Therefore, the speed of the vehicle system entirety gravity center means the moving speed of the representative point of the vehicle 1.

Figure 5:
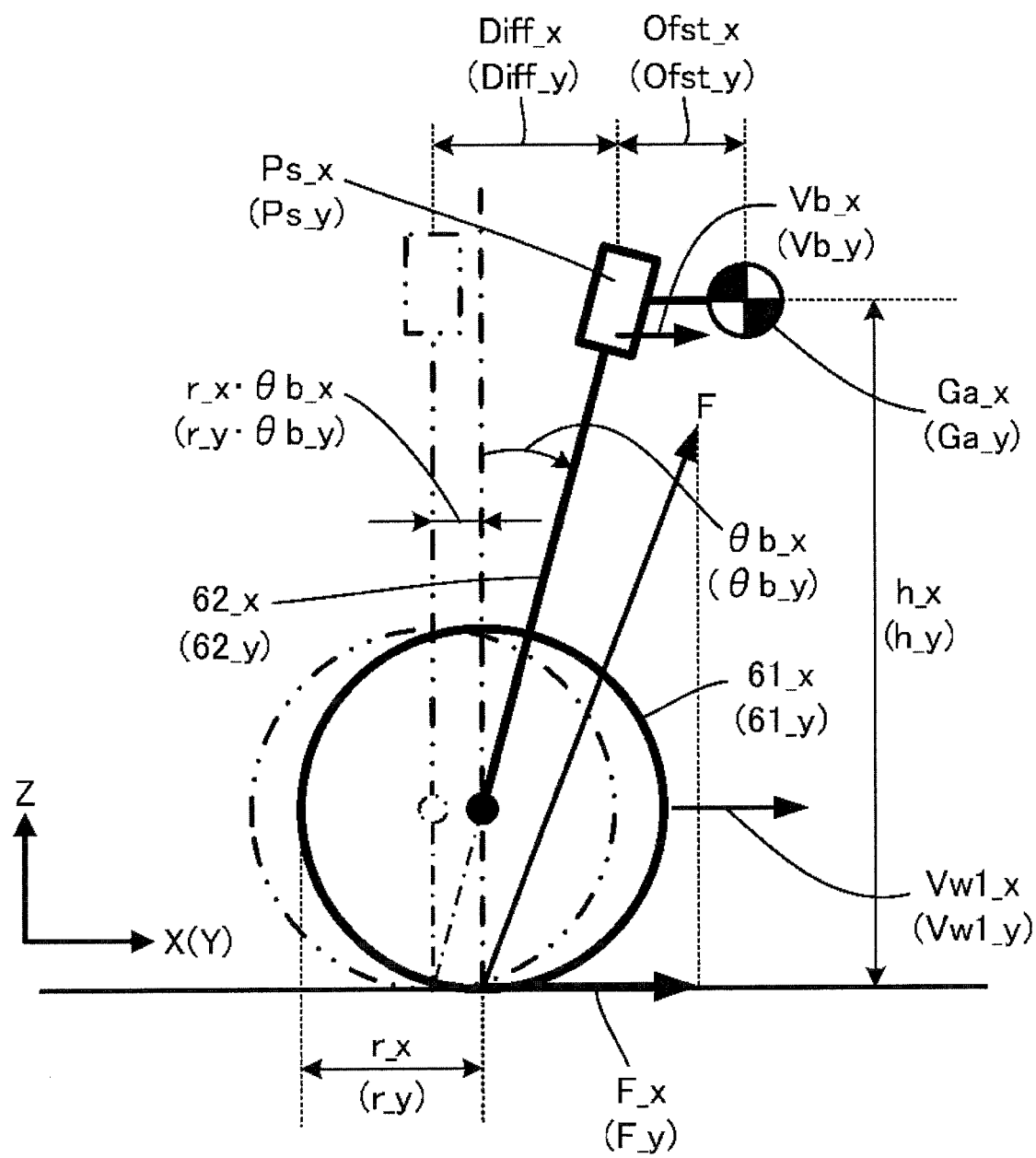
FIG. 5 is a drawing for explaining an inverted pendulum model used for processing of the first control processing unit shown in FIG. 3.

Here, before processing of the respective function units of the first control processing unit 24 is described specifically, facts that become the base of the processing will be described. The dynamic behavior of the vehicle system entirety gravity center (more specifically, the behavior as viewed in the Y-axis direction and the behavior as viewed in the X-axis direction) is approximately expressed by the behavior of an inverted pendulum model as shown in FIG. 5. The algorithm of the processing of the first control processing unit 24 is constructed on the basis of this behavior.

Also, including the reference signs in FIG. 5, in the description below, the suffix "_x" means the reference sign of the variables and the like as viewed from the Y-axis direction, and the suffix "_y" means the reference sign of the variables and the like as viewed from the X-axis direction. Further, in FIG. 5, in order to illustrate both of the inverted pendulum model as viewed from the Y-axis direction and the inverted pendulum model as viewed from the X-axis direction, the reference signs of the variables as viewed from the Y-axis direction is not in parentheses, and the reference signs of the variables as viewed from the X-axis direction is in parentheses.

The inverted pendulum model expressing the behavior of the vehicle system entirety gravity center as viewed from the Y-axis direction includes an imaginary wheel 61_x having the rotation axis parallel to the Y-axis direction and rollable on the floor surface (hereinafter referred to as the imaginary wheel 61_x), a rod 62_x extended from the rotation center of the imaginary wheel 61_x and swingable around the rotation axis of the imaginary wheel 61_x (in the direction around Y-axis), and a mass point Ga_x connected to a reference Ps_x that is the distal end (upper end) of the rod 62_x.

In the inverted pendulum model, the motion of the mass point Ga_x is equivalent to the motion of the vehicle system entirety gravity center as viewed from the Y-axis direction, and the inclination angle θb_x (the inclination angle in the direction around Y-axis) of the rod 62_x with respect to the vertical direction agrees to the inclination angle in the direction around Y-axis of the occupant riding section 5 (or the base 2). Also, the translational motion in the X-axis direction of the first moving motion unit 3 is equivalent to the translational motion in the X-axis direction caused by rolling of the imaginary wheel 61_x.

Further, the radius r_x of the imaginary wheel 61_x and the height h_x of the reference Ps_x and the mass point Ga_x from the floor surface are made preset values (constant values) that are set beforehand. Also, in other words, r_x is equivalent to the height of the center of tilting of the occupant riding section 5 (or the base 2) in the direction around −Y-axis from the floor surface. In the present embodiment, this r_x is equivalent to the distance between the axis of the annular core bodies 6 of the first moving motion unit 3 and the grounding surface.

In a similar manner, the inverted pendulum model expressing the behavior of the vehicle system entirety gravity center as viewed from the X-axis direction includes an imaginary wheel 61_y having the rotation axis parallel to the X-axis direction and rollable on the floor surface (hereinafter referred to as the imaginary wheel 61_y), a rod 62_y extended from the rotation center of the imaginary wheel 61_y and swingable around the rotation axis of the imaginary wheel 61_y (in the direction around X-axis), and a mass point Ga_y connected to a reference Ps_y that is the distal end (upper end) of the rod 62_y.

In the inverted pendulum model, the motion of the mass point Ga_y is equivalent to the motion of the vehicle system entirety gravity center as viewed from the X-axis direction, and the inclination angle θb_y (the inclination angle in the direction around X-axis) of the rod 62_y with respect to the vertical direction agrees to the inclination angle in the direction around X-axis of the occupant riding section 5 (or the base 2). Also, the translational motion in the Y-axis direction of the first moving motion unit 3 is equivalent to the translational motion in the Y-axis direction caused by rolling of the imaginary wheel 61_y.

Further, the radius r_y of the imaginary wheel 61_y and the height h_y of the reference Ps_y and the mass point Ga_y from the floor surface are made preset values (constant values) that are set beforehand. Also, in other words, r_y is equivalent to the height of the center of tilting of the occupant riding section 5 (or the base 2) in the direction around X-axis from the floor surface. In the present embodiment, this r_y is equivalent to the radius of the rollers 7 of the first moving motion unit 3. Also, the height h_y of the reference Ps_y and the mass point Ga_y as viewed from the X-axis direction from the floor surface is the same as the height h_x of the reference Ps_x and the mass point Ga_x as viewed from the Y-axis direction from the floor surface. Therefore, h_x=h_y=h is to be hereinafter noted.

Here, a comment will be added on the positional relation between the reference Ps_x and the mass point Ga_x as viewed from the Y-axis direction. The position of the reference Ps_x is equivalent to the position of the vehicle system entirety gravity center in a case where the occupant riding (sitting on) the occupant riding section 5 is assumed to be immobile with respect to the occupant riding section 5. Therefore, in this case, the position of the mass point Ga_x agrees to the position of the reference Ps_x. This is similar also with respect to the positional relation between the reference Ps_y and the mass point Ga_y as viewed from the X-axis direction.

However, in fact, an occupant riding on the occupant riding section 5 moves the upper body and the like thereof with respect to the occupant riding section 5 (or the base 2), and thereby the position in the X-axis direction and the position in the Y-axis direction of the actual vehicle system entirety gravity center come to be shifted to the lateral direction respectively from the positions of the reference Ps_x, Ps_y in general. Therefore, in FIG. 5, the positions of the mass points Ga_x, Ga_y are illustrated in a state shifted respectively from the positions of the reference Ps_x, Ps_y.

The behavior of the vehicle system entirety gravity center expressed by the inverted pendulum model as described above is expressed by expressions (1a), (1b), (2a), (2b) below. In this case, the expressions (1a), (1b) express the behavior as viewed in the Y-axis direction, and the expressions (2a), (2b) express the behavior as viewed in the X-axis direction.

$$Vb\_x = Vw1\_x + h\_x \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h\_y \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

Here, Vb_x is the speed (translational speed) in the X-axis direction of the vehicle system entirety gravity center, Vw1_x is the moving speed (translational speed) in the X-axis direction of the imaginary wheel 61_x, θb_x is the inclination angle in the direction around Y-axis of the occupant riding section 5 (or the base 2), ωb_x is the temporal change rate of θb_x (=dθb_x/dt), Ofst_x is the shift amount in the X-axis direction of the position in the X-axis direction of the vehicle system entirety gravity center (the position in the X-axis direction of the mass point Ga_x) from the position of the reference Ps_x, Vb_y is the speed (translational speed) in the Y-axis direction of the vehicle system entirety gravity center, Vw1_y is the moving speed (translational speed) in the Y-axis direction of the imaginary wheel 61_y, θb_y is the inclination angle in the X-axis direction of the occupant riding section 5 (or the base 2), ωb_y is the temporal change rate of θb_y (=dθb_y/dt), and Ofst_y is the shift amount in the Y-axis direction of the position in the Y-axis direction of the vehicle system entirety gravity center (the position in the Y-axis direction of the mass point Ga_y) from the position of the reference Ps_y. Also, ωz is the yaw rate (the angular velocity in the direction around the yaw axis) when the vehicle 1 turns, and g is the gravitational acceleration constant. Further, the positive direction of θb_x, ωb_x is the direction that the vehicle system entirety gravity center inclines to the positive direction of X-axis (forward), and the positive direction of θb_y, ωb_y is the direction that the vehicle system entirety gravity center inclines to the positive direction of Y-axis (leftward). Furthermore, the positive direction of ωz is the counterclockwise direction when the vehicle 1 is viewed from above.

Also, Vb_x, Vb_y agree to the moving speed in the X-axis direction of the reference Ps_x and the moving speed in the Y-axis direction of the reference Ps_y, respectively.

The second term of the right side of the expression (1a) (=h·ωb_x) is the translational speed component in the X-axis direction of the reference Ps_x generated by tilting of the occupant riding section 5 in the direction around Y-axis, and the second term of the right side of the expression (2a) (=h·ωb_y) is the translational speed component in the Y-axis direction of the reference Ps_y generated by tilting of the occupant riding section 5 in the direction around −X-axis.

In addition, more specifically, Vw1_x in the expression (1a) is the relative circumferential speed of the imaginary wheel 61_x with respect to the rod 62_x (in other words, with respect to the occupant riding section 5 or the base 2). Therefore, in Vw1_x, in addition to the moving speed in the X-axis direction of the grounding point of the imaginary wheel 61_x to the floor surface (the moving speed in the X-axis direction of the grounding point of the first moving motion unit 3 to the floor surface), a velocity component accompanying tilting of the rod 62_x (=r_x·ωb_x) is included. This fact is similar to Vw1_y in the expression (2a) also.

Also, the first term of the right side of the expression (1b) is the acceleration component in the X-axis direction generated in the vehicle system entirety gravity center by the component in the X-axis direction (F_x in FIG. 5) of the floor reaction force (F in FIG. 5) applied to the grounding part of the imaginary wheel 61_x according to the shift amount (=θb_x·(h−r_x)+Ofst_x) of the position in the X-axis direction of the vehicle system entirety gravity center (the position in the X-axis direction of the mass point Ga_x) from the upper position in the vertical direction of the grounding part of the imaginary wheel 61_x (the grounding part of the first moving motion unit 3 as viewed in the Y-axis direction), and the second term of the right side of the expression (1b) is the acceleration component in the X-axis direction generated by the centrifugal force applied to the vehicle 1 in turning at the yaw rate of ωz.

Similarly, the first term of the right side of the expression (2b) is the acceleration component in the Y-axis direction generated in the vehicle system entirety gravity center by the component in the Y-axis direction (F_y in FIG. 5) of the floor reaction force (F in FIG. 5) applied to the grounding part of the imaginary wheel 61_y according to the shift amount (=θb_y·(h−r_y)+Ofst_y) of the position in the Y-axis direction of the vehicle system entirety gravity center (the position in the Y-axis direction of the mass point Ga_y) from the upper position in the vertical direction of the grounding part of the imaginary wheel 61_y (the grounding part of the first moving motion unit 3 as viewed in the X-axis direction), and the second term of the right side of the expression (2b) is the acceleration component in the Y-axis direction generated by the centrifugal force applied to the vehicle 1 in turning at the yaw rate of ωz.

Figure 6:
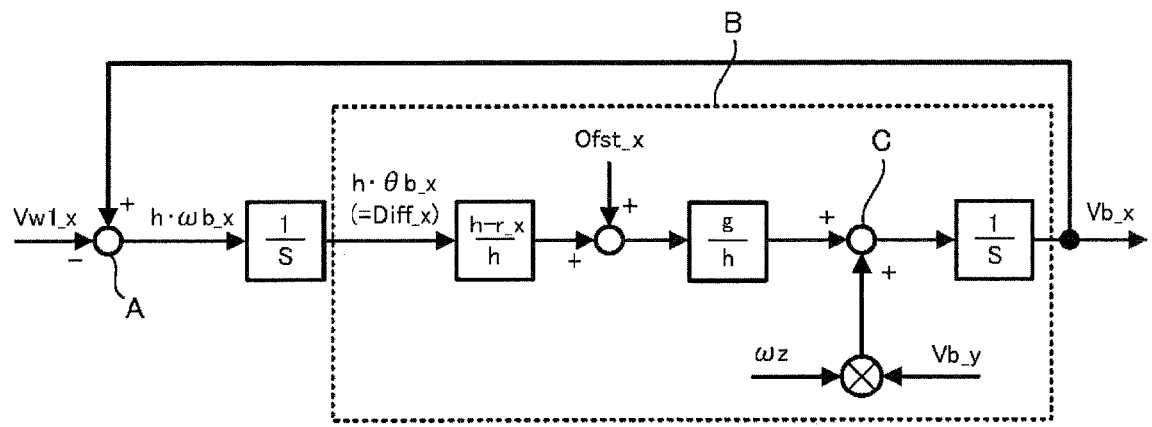
FIG. 6 is a block diagram showing a behavior in relation with the inverted pendulum model of FIG. 5.

As described above, the behavior expressed by the expressions (1a), (1b) (the behavior as viewed in the X-axis direction) is expressed as shown in FIG. 6 when expressed by a block diagram. 1/s in the drawing expresses integral calculation.

Also, processing of the calculation unit marked with the reference sign A in FIG. 6 corresponds to the relation formula of the expression (1a), and processing of the calculation unit marked with the reference sign B corresponds to the relation formula of the expression (1b).

Further, h·θb_x in FIG. 6 approximately agrees to Diff_x shown in FIG. 5.

On the other hand, the block diagram that expresses the behavior expressed by the expressions (2a), (2b) (the behavior as viewed in the Y-axis direction) is obtained by substituting "_y" for the suffixes "_x" in FIG. 6 and substituting "−" for the marks "+" of the acceleration component (the acceleration component generated by the centrifugal force) on the lower side in the drawing that is one of the inputs to the adder marked with the reference sign C.

In the present embodiment, as described above, the algorithm of processing of the first control processing unit 24 is constructed based on a behavior model of the vehicle system entirety gravity center (inverted pendulum model) that takes the shift amount of the vehicle system entirety gravity center from the references Ps_x, Ps_y and the centrifugal force into consideration.

On the premise of the above, processing of the first control processing unit 24 will be described more specifically. Also, in the description below, a set of a value of a variable in relation with the behavior as viewed from the Y-axis direction and a value of a variable in relation with the behavior as viewed from the X-axis direction may be expressed adding the suffix "_xy".

Reference is made to FIG. 4. At each calculation processing period of the control device 21, the first control processing unit 24 executes processing of the operation command conversion unit 31 and processing of the gravity center speed estimation unit 33 first.

The operation command conversion unit 31 determines a basic speed command Vjs_xy that is a basic command value of the moving speed (translational speed) of the first moving motion unit 3 according to an advancing/retreating command given by the joy stick 12 (an operation signal showing the swing amount in the X-axis direction of the joy stick 12 and the direction of the swing thereof) or a transverse moving command (an operation signal showing the swing amount in the Y-axis direction of the joy stick 12 and the direction of the swing thereof).

In this case, out of the basic speed command Vjs_xy, the basic speed command Vjs_x in the X-axis direction is determined according to the advancing/retreating command. More specifically, when the swing amount of the joy stick 12 shown by the advancing/retreating command is a swing amount toward the front, the basic speed command Vjs_x in the X-axis direction is made the speed command for the advancing direction of the vehicle 1, and, when the swing amount of the joy stick 12 is a swing amount toward the rear, the basic speed command Vjs_x in the X-axis direction is made the speed command for the retreating direction of the vehicle 1. Also, in this case, the magnitude of the basic speed command Vjs_x in the X-axis direction is determined so as to increase in the range of a predetermined upper limit value or below as the swing amount of the joy stick 12 to the front side or the rear side increases.

Further, a predetermined range where the swing amount of the joy stick 12 to the front side or the rear side becomes minute enough is made a dead zone, and it may be configured that the basic speed command Vjs_x in the X-axis direction is set to zero for the swing amount within the dead zone.

Also, out of the basic speed command Vjs_xy, the basic speed command Vjs_y in the Y-axis direction is determined according to the transverse moving command. More specifically, when the swing amount of the joy stick 12 shown by the transverse moving command is a swing amount toward the right, the basic speed command Vjs_y in the Y-axis direction is made the speed command toward the right of the vehicle 1, and, when the swing amount of the joy stick 12 is a swing amount toward the left side, the basic speed command Vjs_y in the Y-axis direction is made the speed command toward the left of the vehicle 1. In this case, the magnitude of the basic speed command Vjs_y in the Y-axis direction is determined so as to increase in the range of a predetermined upper limit value or below as the swing amount of the joy stick 12 toward the right or toward the left increases.

Further, with respect to the magnitude of the basic speed command Vjs_y, a predetermined range where the swing amount of the joy stick 12 toward the right or toward the left becomes minute enough is made a dead zone, and it may be configured that the basic speed command Vjs_y in the Y-axis direction is set to zero for the swing amount within the dead zone.

Also, when the joy stick 12 is operated in both of the front/rear direction (X-axis direction) and the right/left direction (Y-axis direction), the magnitude of the basic speed command Vjs_y in the Y-axis direction may be changed according to the swing amount of the joy stick 12 in the front/rear direction or the basic speed command Vjs_x in the X-axis direction.

The gravity center speed estimation unit 33 calculates an estimate value Vb_estm1_xy of the speed of the vehicle system entirety gravity center based on a geometric (kinematic) relation formula expressed by the expressions (1a), (2a) in the inverted pendulum model.

More specifically, as shown in the block diagram of FIG. 4, the estimate value Vb_estm1_xy of the speed of the vehicle system entirety gravity center is calculated by adding a value of the actual translational speed Vw1_act_xy of the first moving motion unit 3 and a value obtained by multiplying the actual temporal change rate ωb_act_xy of the inclination angle θb_xy (inclination angular velocity) of the occupant riding section 5 by the height h of the vehicle system entirety gravity center.

That is, the estimate value Vb_estm1_x of the speed in the X-axis direction and the estimate value Vb_estm1_y of the speed in the Y-axis direction of the vehicle system entirety gravity center are calculated respectively by expressions (3a), (3b) below.

$$Vb\_estm1\_x = Vw1\_act\_x + h \cdot \omega b\_act\_x \qquad (3a)$$

$$Vb\_estm1\_y = Vw1\_act\_y + h \cdot \omega b\_act\_y \qquad (3b)$$

However, the temporal change rate of the shift amount Ofst_xy of the position of the vehicle system entirety gravity center from the position of the reference Ps_xy (hereinafter referred to as a gravity center shift amount Ofst_xy) was assumed to be small enough compared to Vb_estm1_xy and negligible.

In this case, for the values of Vw1_act_x, Vw1_act_y in the calculation above, in the present embodiment, target values Vw1_cmd_x, Vw1_cmd_y (values of the last time) of the moving speed of the first moving motion unit 3 determined by the attitude control calculation unit 34 at the last calculation processing period are used.

However, it may be configured for example that each rotational speed of the electric motors 8a, 8b is detected by a rotational speed sensor such as a rotary encoder and the like and newest values of Vw1_act_x, Vw1_act_y estimated from these estimate values (in other words, newest values of the measured values of Vw1_act_x, Vw1_act_y) are used for calculation of the expressions (3a), (3b).

Also, for the values of ωb_act_x, ωb_act_y, in the present embodiment, newest values of the temporal change rate of the measured value of the inclination angle θb of the occupant riding section 5 based on the detection signal of the inclination sensor 22 (in other words, newest values of the measured values of ωb_act_x, ωb_act_y) are used.

The first control processing unit 24 determines a gravity center shift amount estimate value Ofst_estm_xy that is the estimate value of the gravity center shift amount Ofst_xy by executing processing of the operation command conversion unit 31 and the gravity center speed estimation unit 33 as described above and thereafter executing processing of a gravity center shift estimation unit 35a shown in FIG. 4.

Figure 7:
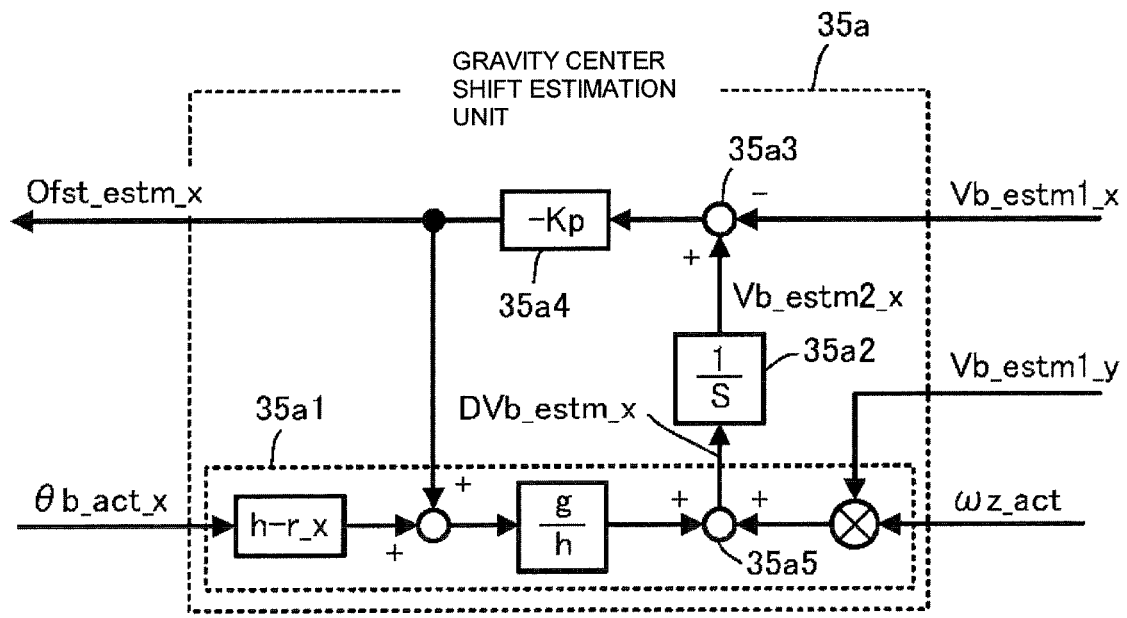
FIG. 7 is a block diagram showing processing of a gravity center shift estimation unit shown in FIG. 4.

Processing of this gravity center shift estimation unit 35a is processing shown by the block diagram of FIG. 7. Also, FIG. 7 typically shows the determining process of the gravity center shift amount estimate value Ofst_estm_x in the X-axis direction out of the gravity center shift amount estimate value Ofst_estm_xy. The estimate value of the right/left direction entirety gravity center shift amount can be calculated one by one by calculation shown in the block diagram of FIG. 7, for example.

More specifically, by multiplying deviations of the moving speed in the right/left direction of the gravity center of the entirety of the vehicle and the occupant (may be hereinafter referred to as the vehicle system entirety gravity center) from the first estimate value Vb_estm1_y and the second estimate value Vb_estm2_y by a gain of a predetermined value determined beforehand, the estimate value of the right/left direction entirety gravity center shift amount can be determined one by one so as to converge to the actual value.

Here, the first estimate value Vb_estm1_y is an estimate value of the moving speed in the right/left direction of the vehicle system entirety gravity center kinematically calculated by an expression (A) below, and the second estimate value Vb_estm2_y is an estimate value of the moving speed calculated by integrating the movement acceleration Dvb_estm2_y in the right/left direction of the vehicle system entirety gravity center dynamically calculated by expression (B) below.

$$Vb\_estm1\_y = Vw1\_act\_y + h \cdot \omega b\_act\_y \qquad (A)$$

$$Dvb\_estm\_y = (\theta b\_act\_y \cdot (h - r\_y) + Ofst\_estm\_y(k-1)) \cdot (g/h)$$

$$-Vb\_estm1\_x \cdot \omega z\_act \qquad (B)$$

In the expressions above;

Vw1_act_y: the observed value of the moving speed in the right/left direction of the first moving motion unit h: the value determined beforehand as the height of the vehicle system entirety gravity center from the floor surface ωb_act_y: the observed value of the angular velocity of tilting of the occupant riding section in the direction around the axis in the front/rear direction θb_act_y: the observed value of the inclination angle in the direction around the axis in the front/rear direction (the inclination angle with respect to the vertical direction e.g.: the direction of an imaginary line that extends orthogonally with respect to the floor surface)) of the occupant riding section r: the height of the center of tilting of the occupant riding section in the direction around the axis in the front/rear direction from the floor surface Ofst_estm_y(k−1): the newest value out of the estimated values of the right/left direction entirety gravity center shift amount having been calculated already g: gravity acceleration constant Vb_estm1_x: the estimate value of the moving speed in the right/left direction of the vehicle system entirety gravity center calculated by expression (C) below $$Vb\_estm1\_x = Vw1\_act\_x + h \cdot \omega b\_act\_x \qquad (C)$$

Vw1_act_x: the observed value of the moving speed in the front/rear direction of the first moving motion unit ωb_act_x: the observed value of the angular velocity of tilting of the occupant riding section in the direction around the axis in the right/left direction ωz_act: the angular velocity of the vehicle in the direction around the yaw axis The "observed value" in relation with an optional quantity of state such as the moving speed and the like means a detection value of the quantity of state detected by an appropriate sensor, or an estimate value estimated based on the correlation from a detection value of other one or more quantity of state having a constant correlation with the quantity of state.

Processing of FIG. 7 will be described specifically. The gravity center shift estimation unit 35a calculates the estimate value DVb_estm_x of the translational acceleration in the X-axis direction of the vehicle system entirety gravity center by executing calculation processing of the right side of the expression (1b) by a calculation unit 35a1 using the measured value (newest value) of the actual inclination angle θb_act_x of the occupant riding section 5 in the direction around Y-axis obtained from the detection signal of the inclination sensor 22, the measured value (newest value) of the actual Yaw rate ωz_act of the vehicle 1 obtained from the detection signal of the yaw rate sensor 23, the first estimate value Vb_estm1_y (newest value) of the speed of the vehicle system entirety gravity center in the Y-axis direction calculated by the gravity center speed estimation unit 33, and the gravity center shift amount estimate value Ofst_estm_x (the value of the last time) in the X-axis direction determined at the calculation processing period of the last time.

Also the gravity center shift estimation unit 35*a* calculates the second estimate value Vb_estm2_x of the speed of the vehicle system entirety gravity center in the X axis direction by executing processing of integrating the estimate value DVb_estm_x of the translational acceleration in the X-axis direction of the vehicle system entirety gravity center by a calculation unit 35*a*2.

Next, the gravity center shift estimation unit 35*a* executes processing of calculating the deviation of the second estimate value Vb_estm2_x (newest value) of the speed of the vehicle system entirety gravity center in the X-axis direction and the first estimate value Vb_estm1_x (the newest value) by a calculation unit 35*a*3.

Further, the gravity center shift estimation unit 35*a* determines the newest value of the gravity center shift amount estimate value Ofst_estm_x in the X-axis direction by executing processing of multiplying this deviation by a predetermined gain (-Kp) by a calculation unit 35*a*4.

Determining processing of the gravity center shift amount estimate value Ofst_estm_y in the Y-axis direction is also executed similarly to the above. More specifically, the block diagram that shows this determining processing is obtained by replacing the suffixes "_x" and "_y" in FIG. 7 with each other and substituting "−" for the marks "+" of the acceleration component (the acceleration component generated by the centrifugal force) on the right side in the drawing that is one of the inputs to an adder 35*a*5.

By such processing of the gravity center shift estimation unit 35*a*, Ofst_estm_xy can be determined so as to converge to an actual value by determining the gravity center shift amount estimate value Ofst_estm_xy while updating it one by one.

Next, the first control processing unit 24 calculates the gravity center shift effect amount Vofs_xy by executing processing of a gravity center shift effect amount calculation unit 35*b* shown in FIG. 4.

The gravity center shift effect amount Vofs_xy expresses the shift of the actual gravity center speed with respect to the target speed of the vehicle system entirety gravity center when feedback-control is executed in the attitude control calculation unit 34 described below without taking that the position of the vehicle system entirety gravity center shifts from the position of the reference Ps_xy in the inverted pendulum model into consideration.

More specifically, this gravity center shift effect amount calculation unit 35*b* calculates the gravity center shift effect amount Vofs_xy by multiplying each component of the newly determined gravity center shift amount estimate value Ofst_estm_xy by a value of (Kth_xy/(h−r_xy))/Kvb_xy.

Also, Kth_xy is a gain value for determining a manipulated variable component that functions so as to bring the inclination angle of the occupant riding section 5 close to zero (target inclination angle) in processing of the attitude control calculation unit 34 described below. Further, Kvb_xy is a gain value for determining a manipulated variable component that functions so as to bring the deviation of the target speed Vb_cmd_xy of the vehicle system entirety gravity center and Vb_estm1_xy in the first estimate value of the speed of the vehicle system entirety gravity center close to zero in processing of the attitude control calculation unit 34 described below.

By executing processing of a gravity center shift correction amount determination unit 36, the first control processing unit 24 determines the gravity center shift correction amount Vdep_x(k) (corresponding to the "translation command correction amount") in the X-axis positive direction based on the estimate value Vb_estm1_x(k) of the vehicle system entirety gravity center speed that is the input signal.

More specifically, this-time accumulation value Σ(k) is calculated by accumulating −Vb_estm1_x(k)×Δt (corresponding to this-time tilting amount of the base 2 toward the first designated direction (X-axis negative direction)) when (condition 1) and (condition 2) are satisfied for the product of previous-time accumulation value Σ(k−1) times the attenuation factor Kdep1 (0<Kdep1<1) of −Vb_estm1_x. "−" is multiplied to express the tilting amount of the base 2 by a positive value in consideration that the polarity of Vb_estm1_x(k) when the base 2 tilts to the X-axis negative direction is negative. "k" expresses discrete time with an interval of the sampling period Δt.

(Condition 1) Vb_estm1_x(k) is negative.
(Condition 2) The previous-time accumulation value Σ(k−1) is less than the threshold value Σ_th.

(Condition 1) is a condition for increasing Σ(k) according to the tilting amount when the base 2 tilts toward the first designated direction (rearward). (Condition 2) is a condition for controlling Σ(k) so as to become the threshold value Σ_th or less. For example, Σ(k) is calculated according to the expression (3c) or (3d). "H" is a step function of the heavy side.

$$\Sigma(k) = Kdep1 \times \Sigma(k-1) + \\ H(\Sigma\_th - \Sigma(k-1)) \times H(-Vb\_estm1\_x(k)) \times (-Vb\_estm1\_x(k))\Delta t \quad (3c)$$

$$\Sigma(k) = \min\{\Sigma\_th, \\ Kdep1 \times \Sigma(k-1) + H(-Vb\_estm1\_x(k)) \times (-Vb\_estm1\_x(k))\Delta t\} \quad (3d)$$

By multiplying the this-time accumulation value Σ(k) by the gain value Kdep2, the gravity center shift correction amount Vdep_x(k) in the X-axis direction is calculated.

Figure 10:
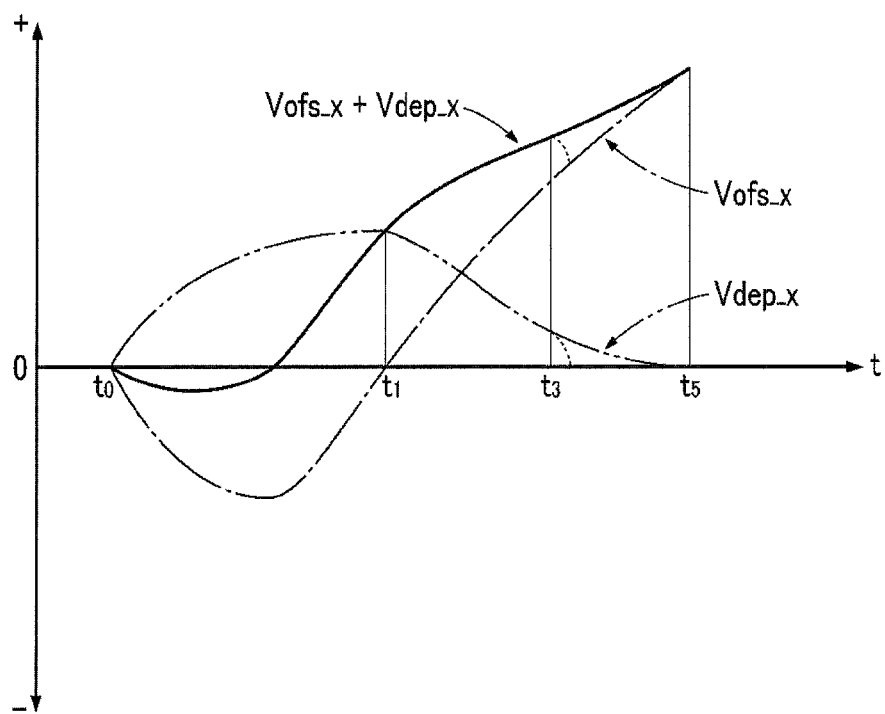
FIG. 10 (a) is an explanatory drawing in relation with the first example of gravity center target speed determination processing.
Figure 10:
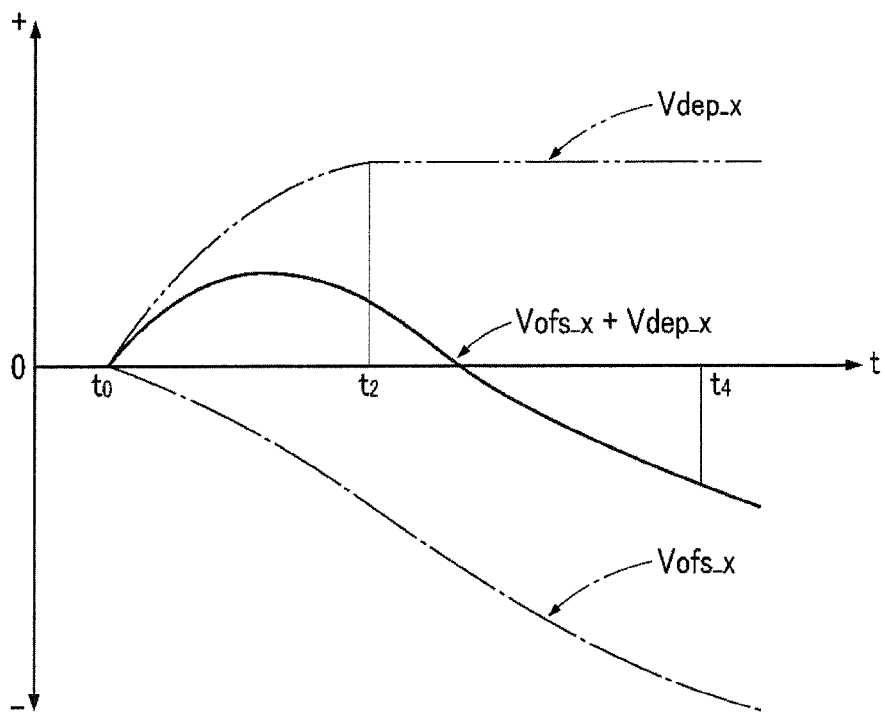

(Determination processing of Vdep_x(k) (the first example))
As the first example, determination processing of Vdep_x(k) when Vofs_x varies as shown by the single-dot chain line in FIG. 10 (*a*) will be studied. This means that the behavior of the vehicle system entirety gravity center is approximated by the behavior of the inverted pendulum model (refer to FIG. 5) shown in FIG. 11 (*a*).

That is, first, from the time t=t0 to the time t=t1, the rod 62_*x* tilts toward the X-axis negative direction, and the mass point Ga_x moves toward the X-axis negative direction (refer to the single-dot chain line). Also, from the time t=t1 to the time t=t5, the rod 62_*x* tilts toward the X-axis positive direction, and the mass point Ga_x moves toward the X-axis positive direction (refer to the sold line). At the time t=t3 before the time t=t5, the imaginary wheel 61_*x* and the vehicle 1 start translation toward the X-axis positive direction (refer to the rightward arrow).

This corresponds, for example, to a situation the occupant riding section 5 (or the base 2) tilts to the rearward direction (the first designated direction) and the vehicle system entirety gravity center shifts to the rear because the user is in an attitude of slightly bent back at the time of sitting on the occupant riding section 5, the base thereafter tilts to the forward direction (the second designated direction) because the user is bent forward, and the vehicle system entirety gravity center shifts to the forward direction.

Because Vb_estm1_x is a negative value in the period from the time t=t0 to the time t=t1, (condition 1) has been satisfied. Therefore H(−Vb_estm1_x(k))=1 is achieved, and Σ(k) is calculated by accumulating (−Vb_estm1_x(k))×Δt. Accordingly, as far as (condition 2) has been satisfied, as shown by the two-dot chain line in FIG. 10 (a), the gravity center shift correction amount Vdep_x is determined so as to increase gradually. On the other hand, the increase rate of the gravity center shift correction amount Vdep_x gradually drops due to the effect of the attenuation factor Kdep1.

Because Vb_estm1_x is a positive value in the period from the time t=t1 to the time t=t5, (condition 1) has not been satisfied. Therefore H(−Vb_estm1_x(k))=0 is achieved, and (−Vb_estm1_x(k))Δt is not accumulated. On the other hand, Σ(k) gradually reduces due to the effect of the attenuation factor Kdep1. Therefore, Vdep_x is determined so as to reduce gradually as shown by the two-dot chain line in FIG. 10 (a).

(Determination Processing of Vdep_x(k) (the Second Example))

As the second example, determination processing of Vdep_x(k) when Vofs_x varies as shown by the single-dot chain line in FIG. 10 (b) will be studied. This means that the behavior of the vehicle system entirety gravity center is approximated by the behavior of the inverted pendulum model (refer to FIG. 5) shown in FIG. 11 (b).

That is, first, from the time t=t0 to the time t=t2, the rod 62_x tilts toward the X-axis negative direction, and the mass point Ga_x moves toward the X-axis negative direction (refer to the single-dot chain line). Also, from the time t=t2 to the time t=t4, the rod 62_x tilts further toward the X-axis negative direction, and the mass point Ga_x moves further toward the X-axis negative direction (refer to the sold line). After the time t=t2, the imaginary wheel 61_x and the vehicle 1 start translation toward the X-axis negative direction (refer to the leftward arrow).

This corresponds, for example, to a situation the occupant intentionally tilts the occupant riding section 5 to the rearward direction (the first designated direction) in a state sitting on the occupant riding section 5 and shifts the vehicle system entirety gravity center rearward.

Because Vb_estm1_x is a negative value in the period from the time t=t0 to the time t=t2, as far as (condition 2) has been satisfied, as shown by the two-dot chain line in FIG. 10 (b), Vdep_x is determined so as to increase gradually.

When it is assumed that Σ(k) becomes a threshold value or more at the time t=t2, because (condition 2) is not satisfied, Σ(k) reduces due to the effect of the attenuation factor Kdep1. On the other hand, when Σ(k) is less than Σ_th, because (condition 2) is satisfied, (−Vb_estm1_x(k))Δt can be accumulated. Therefore, as shown by the two-dot chain line in FIG. 10 (b), Vdep_x is determined so as to be maintained generally constant. Depending on the value of Vofs_x or the value of Kdep1 at the time t=t2 and onward, there is also a case where Vdep_x gradually reduces.

The first control processing unit 24 executes processing of a processing unit 35c, and corrects Vofs_x by adding the gravity center shift correction amount Vdep_x to the gravity center shift effect amount Vofs_x (corresponding to the "basic translation command value").

Next, by executing processing of the gravity center target speed determination unit 32 shown in FIG. 4, the first control processing unit 24 calculates the post-restriction gravity center target speed Vb_cmd_xy based on the basic speed command Vjs_xy determined by the operation command conversion unit 31 and the gravity center shift effect amount Vofs_xy determined by the gravity center shift effect amount calculation unit 35b. The gravity center shift effect amount Vofs_x inputted to the gravity center target speed determination unit 32 has been corrected by adding the gravity center shift correction amount Vdep_x as described above.

First, the gravity center target speed determination unit 32 executes processing of a processing unit shown in FIG. 4. This processing unit 32c determines a target gravity center speed adding amount Vb_cmd_by_ofs_xy as a component according to the shift of the gravity center out of the target value of the vehicle system entirety gravity center by executing dead zone processing and limiting processing in relation with the value of the gravity center shift effect amount Vofs_xy.

More specifically, in the present embodiment, when the magnitude of the gravity center shift effect amount Vofs_xy in the X-axis direction is a value within the dead zone that is a predetermined range in the vicinity of zero (a value comparatively near to zero), the gravity center target speed determination unit 32 makes the target gravity center speed adding amount Vb_cmd_by_ofs_xy in the X-axis direction zero.

Also, when the magnitude of the gravity center shift effect amount Vofs_x in the X-axis direction is a value deviated from the dead zone, the gravity center target speed determination unit 32 determines the target gravity center speed adding amount Vb_cmd_by_ofs_x in the X-axis direction to be of a polarity same as that of Vofs_x and so that the magnitude thereof increases as the magnitude of Vofs_x increases. However, the value of the target gravity center speed adding amount Vb_cmd_by_ofs_x is restricted to the range between predetermined upper limit value (>0) and lower limit value (≤0).

The determining process of the target gravity center speed adding amount Vb_cmd_by_ofs_y in the Y-axis direction is also similar to the above.

Although the processing unit 32c in the present embodiment is a two-stage limiter having a dead zone and a pair of positive and negative saturation bands, it may be a multi-stage limiter having a dead zone and plural pairs of saturation bands. Processing execution of the processing unit 32c may be omitted.

Next, the gravity center target speed determination unit 32 executes processing for determining the target speed V1_xy that is obtained by adding each component of the target gravity center speed adding amount Vb_cmd_by_ofs_xy to each component of the basic speed command Vjs_xy which is determined by the operation command conversion unit 31 by a processing unit 32d shown in FIG. 4. That is, V1_xy (a set of V1_x and V1_y) is determined by processing of V1_x=Vjs_x+Vb_cmd_by_ofs_x, V1_y=Vjs_y+Vb_cmd_by_ofs_y.

Further, the gravity center target speed determination unit 32 executes processing of a processing unit 32e. This processing unit 32e executes limiting processing for determining the post-restriction gravity center target speed Vb_cmd_xy (a set of Vb_cmd_x and Vb_cmd_y) as the target speed of the vehicle system entirety gravity center obtained by restricting combination of the target speed V1_x and V1_y in order that each rotational speed of the electric motor 8a, 8b as the actuator device 8 of the first moving motion unit 3 does not deviate from a predetermined allowable range.

In this case, when a set of the target speeds V1_x and V1_y obtained by the processing unit 32d exists within a predetermined region on a coordination system with the value of the target speed V1_x on the axis of ordinates and with the value of the target speed V1_y on the axis of abscissas (the region of the octagonal shape for example), the target speed V1_xy is determined as the post-restriction gravity center target speed Vb_cmd_xy as it is.

Also when a set of the target speeds V1_x and V1_y obtained by the processing unit 32d deviates from the predetermined region on the coordination system, one restricted to a set on the boundary of the predetermined region is determined as the post-restriction gravity center target speed Vb_cmd_xy.

As described above, because the gravity center target speed Vb_cmd_xy is determined based on the basic speed command Vjs_xy and the gravity center shift effect amount Vofs_xy (or the gravity center shift), the occupant can steer the vehicle 1 by operation of the controller (operation of the joy stick 12) and by change of the attitude of the body of the occupant (movement of the body weight).

After executing processing of the gravity center target speed determination unit 32 as described above, next, the first control processing unit 24 executes processing of the attitude control calculation unit 34. The attitude control calculation unit 34 determines the first target speed Vw1_cmd_xy that is the target value of the moving speed (translational speed) of the first moving motion unit 3 by processing shown in the block diagram of FIG. 4.

More specifically, first, the attitude control calculation unit 34 determines the target speed after gravity center shift compensation Vb_cmpn_cmd_xy (newest value) by executing processing of reducing each component of the gravity center shift effect amount Vofs_xy by a calculation unit 34b from each component of the post-restriction gravity center target speed Vb_cmd_xy.

Next, the attitude control calculation unit 34 calculates the target translational acceleration DVw1_cmd_x in the X-axis direction and the target translational acceleration DVw1_cmd_y in the Y-axis direction out of the target translational acceleration DVw1_cmd_xy that is the target value of the translational acceleration of the grounding point of the first moving motion unit 3 by processing of the calculation unit 34b and the calculation units excluding an integration calculation unit 34a that executes integration calculation by calculation of expressions (4a), (4b) below, respectively.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

Kvb_xy, Kth_xy, Kw_xy in the expressions (4a), (4b) are predetermined gain values that are set beforehand.

Also, the first term of the right side of the expression (4a) is a feedback manipulated variable component according to the deviation of the target speed after gravity center shift compensation Vb_cmpn_cmd_x (newest value) in the X-axis direction of the vehicle system entirety gravity center and the first estimate value Vb_estm1_x (newest value), the second term is a feedback manipulated variable component according to the measured value (newest value) of the actual inclination angle θb_act_x in the direction around Y-axis of the occupant riding section 5, and the third term is a feedback manipulated variable component according to the measured value (newest value) of the actual inclination angular velocity ωb_act_x in the direction around Y-axis of the occupant riding section 5. Further, the target translational acceleration DVw1_cmd_x in the X-axis direction is calculated as a combined manipulated variable of these feedback manipulated variable components.

Similarly, the first term of the right side of the expression (4b) is a feedback manipulated variable component according to the deviation of the target speed after gravity center shift compensation Vb_cmpn_cmd_y (newest value) in the Y-axis direction of the vehicle system entirety gravity center and the first estimate value Vb_estm1_y (newest value), the second term is a feedback manipulated variable component according to the measured value (newest value) of the actual inclination angle θb_act_y in the direction around X-axis of the occupant riding section 5, and the third term is a feedback manipulated variable component according to the measured value (newest value) of the actual inclination angular velocity ωb_act_y in the direction around X-axis of the occupant riding section 5. Further, the target translational acceleration DVw1_cmd_y in the Y-axis direction is calculated as a combined manipulated variable of these feedback manipulated variable components.

Next, the attitude control calculation unit 34 determines the first target speed Vw1_cmd_xy (newest value) of the first moving motion unit 3 by integrating each component of the target translational acceleration DVw1_cmd_xy by the integration calculation unit 34a.

Also, the first control processing unit 24 controls the electric motors 8a, 8b as the actuator device 8 of the first moving motion unit 3 according to the first target speed Vw1_cmd_xy determined as described above. More specifically, the first control processing unit 24 determines the current command value of the each electric motor 8a, 8b by feedback control processing so that actual rotational speed (measured value) follows up the target value of the rotational speed of the each electric motor 8a, 8b decided by the first target speed Vw1_cmd_xy, and executes energization of the each electric motor 8a, 8b according to this current command value.

By processing described above, in a state where the post-restriction gravity center target speed Vb_cmd_xy is a constant value, motion of the vehicle 1 is settled, and the vehicle 1 is moving straight at a constant speed, the vehicle system entirety gravity center exists just above the grounding point of the first moving motion unit 3. In this state, the actual inclination angle θb_act_xy of the occupant riding section 5 becomes −Ofst_xy/(h−r_xy) based on the expressions (1b, 2b). Also, the actual inclination angular velocity ωb_act_xy of the occupant riding section 5 becomes zero, and the target translational acceleration DVw1_cmd_xy becomes zero. From this fact and the block diagram of FIG. 4, agreement of Vb_estm1_xy and Vb_cmd_xy is derived.

That is, the first target speed Vw1_cmd_xy of the first moving motion unit 3 is basically determined so that the deviation of the post-restriction gravity center target speed Vb_cmd_xy and the first estimate value Vb_estm1_xy of the vehicle system entirety gravity center converges to zero.

Also, each rotational speed of the electric motor 8a, 8b as the actuator device 8 of the first moving motion unit 3 is controlled so as not to deviate from a predetermined allowable range by processing of the processing unit 32e while compensating the effect of the event that the position of the vehicle system entirety gravity center shifts from the position of the reference Ps_xy in the inverted pendulum model.

In addition, because Vb_cmpn_cmd_x = Vb_cmd_x − Vofs_x = Vb_cmd_x − (Kth/h−r_x)·(1/Kvb)·Ofst_estm_x and Vb_cmpn_cmd_y = Vb_cmd_y − Vofs_y = Vb_cmd_y − (Kth/h−r_y)·(1/Kvb)·Ofst_estm_y in the expressions (4a), (4b), the expressions (4a), (4b) can be rewritten to expressions (4a)', (4b)' below, respectively.

$$DVw1\_cmd\_x = Kvb \cdot (Vb\_cmd\_x - Vb\_estm1\_x) - Kth \cdot (Ofst\_estm\_x/(h-r\_x) + \theta b\_act\_x) - Kw\_x \cdot \omega b\_act\_x \quad (4a)'$$

$$DVw1\_cmd\_y = Kvb \cdot (Vb\_cmd\_y - Vb\_estm1\_y) - Kth \cdot (Ofst\_estm\_y/(h-r\_y) + \theta b\_act\_y) - Kw\_y \cdot \omega b\_act\_y \quad (4b)'$$

In this case, the second term of the right side of the expressions (4a)', (4b)' has the meaning as the feedback manipulated variable component for bringing the actual position of the vehicle system entirety gravity center in the X-axis direction and the Y-axis direction to the position just above the grounding part of the first moving motion unit 3.

Above is the detail of processing of the first control processing unit 24 in the present embodiment.

Next, processing of the second control processing unit 25 will be described referring to FIG. 8. Roughly speaking on processing thereof, the second control processing unit 25 determines presence/absence of the request for turning the vehicle 1 (hereinafter referred to as a turning request) or the degree of the turning request based on the actual motion state in the Y-axis direction (the right/left direction of the occupant) of the representative point of the vehicle 1 such as the vehicle system entirety gravity center or the first moving motion unit 3 or the motion state of the target, or the action state of the occupant in relation with the motion states.

In the present embodiment, as an indicator for determining presence/absence of the turning request or the degree of the turning request, the estimate value Vb_estm1_y of the moving speed in the Y-axis direction of the vehicle system entirety gravity center calculated by the gravity center speed estimation unit 33 is used. Also, because Vb_estm1_y agrees to the moving speed in the Y-axis direction of the reference Ps_y, it has the meaning as the observed value of the moving speed in the Y-axis direction of the representative point fixed with respect to the occupant riding section 5 (or the base 2).

Further, when it is determined that there is a turning request, in order to make the vehicle 1 turn, the second control processing unit 25 determines the second target speed Vw2_cmd_y in the Y-axis direction of the second moving motion unit 4 so as to be different from the first target speed Vw1_cmd_y in the Y-axis direction of the first moving motion unit 3.

Such processing of the second control processing unit 25 is executed specifically as described below. That is, with reference to FIG. 8, first, the second control processing unit 25 executes processing of a processing unit 41. To the processing unit 41, the estimate value Vb_estm1_y (newest value) of the moving speed in the Y-axis direction of the vehicle system entirety gravity center calculated by the gravity center speed estimation unit 33 is inputted. Also, the processing unit 41 determines the speed after dead zone processing Vw1a_y according to Vb_estm1_y.

Here, when the occupant of the vehicle 1 intends to turn the vehicle 1 to the right or left, the occupant normally tries to shift the gravity center of himself or herself to the right or left of the vehicle 1 by tilting the upper body of the occupant himself or herself to the right or left. At this time, the first target speed Vw1_cmd_y in the right/left direction of the first moving motion unit 3 determined by control processing of the first control processing unit 24 basically becomes the moving speed to the right or to the left.

However, even when the occupant does not intend to turn the vehicle 1, the gravity center of the occupant himself or herself may possibly shifts to the right or left to some extent by drift of the upper body of the occupant.

Figure 8:
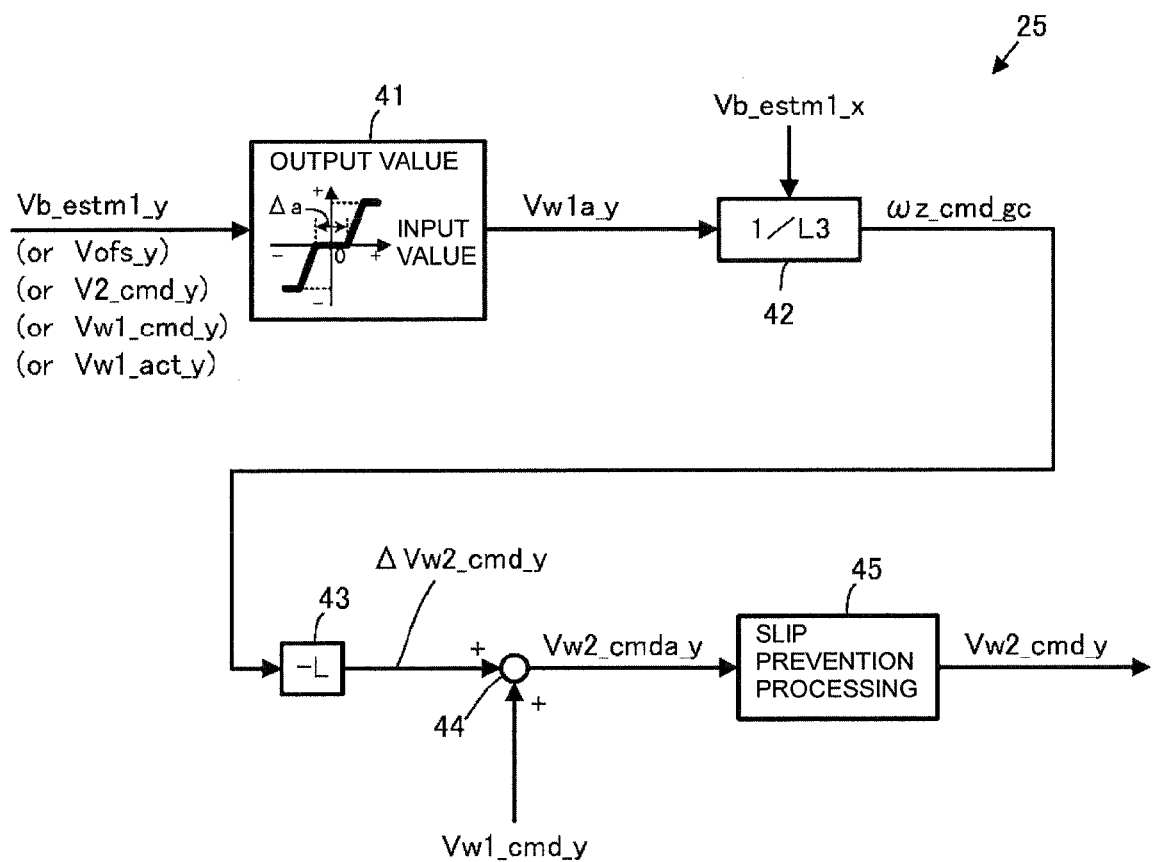
FIG. 8 is a block diagram showing processing of the second control processing unit shown in FIG. 3.

Therefore, by the characteristic of the graph shown in FIG. 8, the processing unit 41 determines the speed after dead zone processing Vw1a_y according to Vb_estm1_y. More specifically, when the absolute value of Vb_estm1_y is comparatively small and Vb_estm1_y is a value within a predetermined range Δa with zero taken in the center (when the absolute value of Vb_estm1_y is equal to or less than a predetermined value determined beforehand), the processing unit 41 deems that there is no turning request, and makes Vw1a_y zero.

Also, when the absolute value of Vb_estm1_y is comparatively large and Vb_estm1_y is a value out of the predetermined range Δa (when the absolute value of Vb_estm1_y is larger than the predetermined value determined beforehand), the processing unit 41 deems that there is a turning request, and sets Vw1a_y to a value that is not zero.

More specifically, the processing unit 41 determines Vw1a_y according to Vb_estm1_y so that the absolute value of Vw1a_y increases accompanying increase of the absolute value of Vb_estm1_y in the range of a predetermined upper limit value or less. In this case, the polarity (direction) of Vw1a_y is made same as that of Vb_estm1_y. As described below, in order to set the center of turning to a preferable position, the increase ratio of Vw1a_y with respect to increase of Vb_estm1_y is preferable to be 1. That is, in a region excluding the dead zone and the saturate region in the graph of FIG. 8, the inclination is preferable to be 1.

Also, in FIG. 8, the reference signs in parentheses on the input side of the processing unit 41 relate to the modifications described below.

Next, the second control processing unit 25 executes processing of a processing unit 42. This processing unit 42 determines the target turning angular velocity ωz_cmd_gc that is the target value of the turning angular velocity (the angular velocity in the direction around the yaw axis) of the vehicle 1 by dividing Vw1a_y by distance L3 in the X-axis direction between the grounding part of the first moving motion unit 3 and the center of turning. In this case, the processing unit 42 sets the distance L3 according to the estimate value Vb_estm1_x (newest value) of the actual moving speed in the X-axis direction of the vehicle system entirety gravity center as the representative point of the vehicle 1.

Also, more specifically, the center of turning means the center of rotation in the direction around the yaw axis of the entirety of the vehicle 1 as viewed on the coordinate system that translationally moves on the floor surface integrally with the first moving motion unit 3.

In the present embodiment, turning of the vehicle 1 is executed in the direction around the yaw axis with a point on the floor surface on the rear side of the grounding part of the first moving motion unit 3 (the rear side of the occupant riding on the occupant riding section 5) being the center of turning. Also, when Vb_estm1_x is zero, the distance L3 in the X-axis direction between the center of turning and the grounding part of the first moving motion unit 3 is set so that the center of turning comes to a position in the vicinity of the grounding part of the second moving motion unit 4. For example, L3 is set so as to agree or generally agree to the distance between the grounding part of the first moving motion unit 3 and the grounding part of the second moving motion unit 4.

Also, when Vb_estm1_x is positive which is the case of moving forward, L3 is set so that the center of turning approaches the grounding part side of the first moving motion unit 3 from the grounding part side of the second moving motion unit 4 (so that the position in the X-axis direction of the center of turning approaches the position just below the occupant riding on the occupant riding section 5 (the position where the occupant is projected to the floor surface)) as the magnitude (absolute value) of Vb_estm1_x increases. That is, L3 is set so as to reduce as the magnitude (absolute value) of Vb_estm1_x increases. However, L3 is restricted to a distance of a predetermined lower limit value (>0) or more.

When Vb_estm1_x is negative which is the case of moving rearward, L3 is preferable to be set to be the same as a value of a case where Vb_estm1_x is zero, or to increase as the magnitude (absolute value) of Vb_estm1_x increases.

The processing unit 42 determines the target turning angular velocity ωz_cmd_gc by dividing Vw1a_y by the distance L3 that is determined thus according to Vb_estm1_x. Also, ωz_cmd_gc is the angular velocity of the left turn (counterclockwise) when Vw1a_y is the leftward velocity, and is the angular velocity of the right turn (clockwise) when Vw1a_y is the rightward velocity.

Next, the second control processing unit 25 executes processing of a processing unit 43. The processing unit 43 calculates the relative moving speed ΔVw2_cmd_y in the Y-axis direction of the second moving motion unit 4 with respect to the first moving motion unit 3 in a case where the vehicle 1 turns at the target turning angular velocity ωz_cmd_gc by multiplying the target turning angular velocity ωz_cmd_gc determined by the processing unit 42 by a value (=−L) of (−1) times of a predetermined distance between the grounding part of the first moving motion unit 3 and the grounding part of the second moving motion unit 4.

In a case of ωz_cmd_gc=0 (in a case where there is no turning request), the relative moving speed ΔVw2_cmd_y in the Y-axis direction of the second moving motion unit 4 thus determined becomes zero. Also, ΔVw2_cmd_y is the rightward velocity when ωz_cmd_gc is the turning angular velocity of the left turn, and is the leftward velocity when ωz_cmd_gc is the turning angular velocity of the right turn. Therefore, ΔVw2_cmd_y of a case where there is a turning request is the velocity of the direction opposite to that of Vw1a_y or Vb_estm1_y.

Next, the second control processing unit 25 executes processing of a processing unit 44. This processing unit 44 determines the basic value Vw2_cmda_y (newest value) of the second target speed Vw2_cmd_y in the Y-axis direction of the second moving motion unit 4 by adding the relative moving speed ΔVw2_cmd_y in the Y-axis direction of the second moving motion unit 4 to the first target speed Vw1_cmd_y (newest value) in the Y-axis direction of the first moving motion unit 3 determined by the first control processing unit 24.

Next, the second control processing unit 25 executes processing of a processing unit 45. This processing unit 45 determines the second target speed Vw2_cmd_y in the Y-axis direction of the second moving motion unit 4 by executing slip preventing processing for preventing slip of the second moving motion unit 4.

In this case, when slip of the second moving motion unit 4 is anticipated to be liable to occur, for example, in the case where the absolute value of the basic value Vw2_cmda_y is excessively large, the processing unit 45 sets the second target speed Vw2_cmd_y in the Y-axis direction of the second moving motion unit 4 to a speed that is corrected from the basic value Vw2_cmda_y. Also, when slip of the second moving motion unit 4 is not anticipated to occur, the processing unit 45 determines the basic value Vw2_cmda_y as it is as the second target speed Vw2_cmd_y in the Y-axis direction of the second moving motion unit 4.

Further, when the friction force between the second moving motion unit 4 and the floor surface can be secured sufficiently, for example, in the case where the second moving motion unit 4 is pressed to the floor surface by a spring and the like, processing of the processing unit 45 may be omitted.

Also, the second control processing unit 25 controls the electric motor 17 as the actuator device of the second moving motion unit 4 according to the second target speed Vw2_cmd_y determined as described above. More specifically, the second control processing unit 25 determines the current command value of the electric motor 17 by feedback control processing so that the actual rotational speed (measured value) follows up the target value of the rotational speed of the electric motor 17 decided by the second target speed Vw2_cmd_y, and executes energization of the electric motor 17 according to this current command value.

Control processing of the second control processing unit 25 is executed as described above. Thus, the second target speed Vw2_cmd_y in the Y-axis direction of the second moving motion unit 4 is determined basically to a speed obtained by adding the relative moving speed ΔVw2_cmd_y to the first target speed Vw1_cmd_y (newest value) in the Y-axis direction of the first moving motion unit 3.

In this case, under the situation that the absolute value of the estimate value Vb_estm1_y of the moving speed in the Y-axis direction of the vehicle system entirety gravity center is small enough and it is determined that there is no turning request, ΔVw2_cmd_y=0 is resulted, and therefore the second target speed Vw2_cmd_y in the Y-axis direction of the second moving motion unit 4 is basically determined so as to agree to the first target speed Vw1_cmd_y in the Y-axis direction of the first moving motion unit 3.

On the other hand, under the situation that the absolute value of the estimate value Vb_estm1_y of the moving speed in the Y-axis direction of the vehicle system entirety gravity center is comparatively large and it is determined that there is a turning request, ΔVw2_cmd_y is determined to a velocity with the direction opposite to that of Vb_estm1_y. Therefore, the second target speed Vw2_cmd_y in the Y-axis direction of the second moving motion unit 4 is basically determined to a velocity with the direction same as that of the first target speed Vw1_cmd_y in the Y-axis direction of the first moving motion unit 3 and with a magnitude smaller than that of Vw1_cmd_y (a velocity of zero or near to zero), or is determined to a velocity with the direction opposite to that of the first target speed Vw1_cmd_y in the Y-axis direction of the first moving motion unit 3.

(Action effect) In the vehicle 1 of the present embodiment, translational movement of the vehicle 1 in the X-axis direction can be executed according to tilting in the front/rear direction (the X-axis direction) of the occupant riding section 5 (or the base 2) accompanying movement of the body of the occupant riding on the occupant riding section 5, or according to the advancing/retreating command outputted according to the swing operation in the front/rear direction of the joy stick 12.

Under such situation that movement in the right/left direction of the gravity center of the occupant himself or herself riding on the occupant riding section 5 (relative movement with respect to the occupant riding section 5) is comparatively small and the estimate value Vb_estm1_y of the moving speed in the Y-axis direction of the vehicle system entirety gravity center falls within a predetermined range Δa in the vicinity of zero, translational movement of the vehicle 1 the Y-axis direction can be executed according to minute tilting in the right/left direction (the Y-axis direction) of the occupant riding section 5 (or the base 2), or according to the transverse movement command outputted according to the swing operation in the right/left direction of the joy stick 12.

Combining these translational movements, translational movement of the vehicle 1 can be executed also in an optional direction oblique with respect to the X-axis direction and the Y-axis direction.

When the estimate value Vb_estm1_y of the moving speed in the Y-axis direction of the vehicle system entirety gravity center deviates from the predetermined range Δa in the vicinity of zero because the occupant riding on the occupant riding section 5 moves the gravity center of the occupant himself or herself comparatively largely in the right/left direction, the second target speed Vw2_cmd_y in the Y-axis direction of the second moving motion unit 4 is determined to a speed shifted from the first target speed Vw1_cmd_y in the Y-axis direction of the second moving motion unit 4 by ΔVw2_cmd_y. Further, in this case, the second target speed Vw2_cmd_y is determined to such speed that makes the vehicle 1 turn around the center of turning on the rear side of the grounding part of the first moving motion unit 3.

Therefore, the occupant can turn the vehicle 1 only by moving the upper body so as to move the gravity center of the occupant himself or herself in the right/left direction. Also, in this case, the vehicle 1 turns in the left when the occupant moves the gravity center of the occupant himself or herself to the left, and the vehicle 1 turns in the right when the occupant moves the gravity center of the occupant himself or herself to the right. Accordingly, the movement of the gravity center of the occupant in the right/left direction and the turning direction of the vehicle 1 conform to each other.

Therefore, the occupant can easily turn the vehicle 1 by movement in the right/left direction of the upper body of the occupant himself or herself, and can easily master the steering operation for turning the vehicle 1.

For example, when the vehicle 1 is to be turned (direction change) in a stop state of the vehicle 1 (the state in which movement of the first moving motion unit 3 and the second moving motion unit 4 almost stops), the first moving motion unit 3 that supports the weight of the occupant and the weight of the major part of the vehicle 1 comes to move in the right/left direction (the Y-axis direction), and therefore a large friction force can be prevented from applying to the first moving motion unit 3. Accordingly, turning (direction change) of the vehicle 1 can be executed smoothly.

When the vehicle 1 is to be turned while the vehicle 1 is moved to the forward direction (the positive direction of X-axis), as the magnitude (absolute value) of the estimate value Vb_estm1_x of the moving speed in the X-axis direction of the vehicle system entirety gravity center as a representative point of the vehicle 1 is larger, the distance L3 between the grounding part of the first moving motion unit 3 and the center of turning becomes smaller, and therefore the occupant can easily make the movement trajectory in turning of the vehicle 1 line with a desired trajectory.

In the present embodiment, the gravity center shift estimation unit 35a of the first control processing unit 24 estimates the gravity center shift amount Ofst_xy of the vehicle system entirety gravity center by processing shown in FIG. 7. Therefore, the gravity center shift amount can be estimated accurately. Also, as described above, according to the estimate value Ofst_estm_xy of this gravity center shift amount Ofst_xy, the target speed (post-restriction gravity center target speed) Vb_cmd_xy of the vehicle system entirety gravity center is determined. Therefore, the effect exerted to the behavior of the vehicle 1 by the gravity center shift amount Ofst_xy can be properly compensated.

In the vehicle 1 of the present embodiment, the swing amount (the swing amount in the direction around Y-axis) of the second moving motion unit 4 with respect to the base 2 is mechanically restricted to within a predetermined range defined by the stoppers 16, 16, and therefore, in particular, the occupant riding section 5 can be prevented from tilting excessively to the rear side which is hard for the occupant to visually confirm.

According to the vehicle 1 of the present embodiment, by the gravity center shift effect amount Vofs_xy calculated according to tilting of the occupant riding section 5, the vehicle 1 can be translated in the tilting direction (refer to FIG. 4 and FIG. 5). For example, in the first example, when negative Vofs_x determined by tilting toward the first designated direction (rearward direction) of the occupant riding section 5 (refer to the single-dot chain line (t=t0–t1) in FIG. 10 ($a$)) is inputted to the gravity center target speed determination unit 32 without being corrected, there is a possibility that Vd_cmd_y is determined to a negative value and the vehicle 1 is translated rearward. When the basic speed command Vjs_x is 0 (when Vjs_x>0 is not applied), such possibility is high.

However, when the occupant riding section 5 tilts toward the first designated direction, by the gravity center shift correction amount Vdep_x (refer to the two-dot chain line in FIG. 10 ($a$)) determined according to the tilting amount, Vofs_x is corrected (refer to the solid line in FIG. 10 ($a$)). Vdep_x with respect to the second designated direction is determined so as to increase as the tilting amount toward the first designated direction of the occupant riding section 5 that is Σ(k) increases (refer to the two-dot chain line (t=t0–t1) in FIG. 10 ($a$)).

Figure 11:
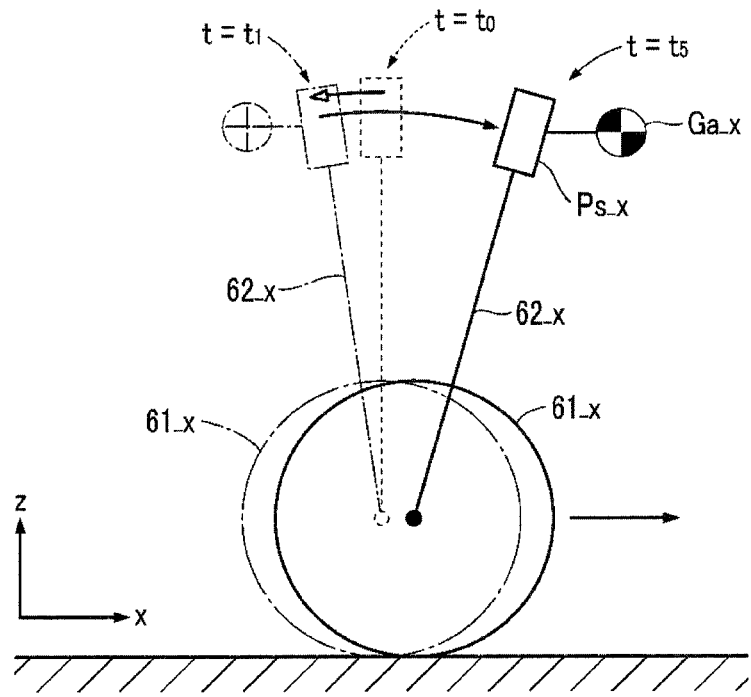
FIG. 11 (a) is an explanatory drawing in relation with the first example of the vehicle motion.
Figure 11:
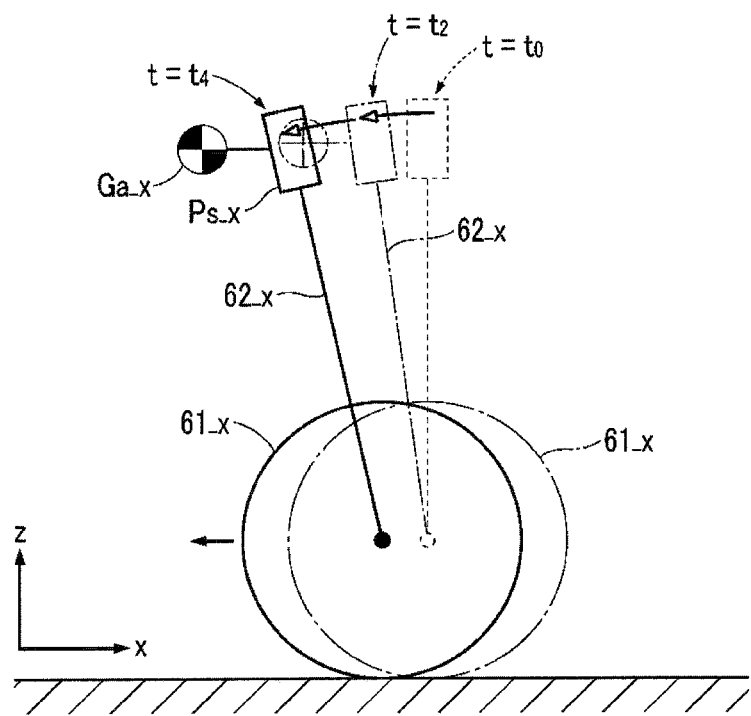

Thus, such an event can be prevented or suppressed that, even though the user intends translation of the vehicle 1 toward the second designated direction (forward direction), according to tilting by an accidental form or large tilting toward the first designated direction of the occupant riding section 5, the vehicle 1 is translated toward the first designated direction in an unexpected form (refer to the single-dot chain line in FIG. 11 ($a$)).

The gravity center shift correction amount Vdep_x is determined so that the increase rate of Vdep_x with respect to the tilting amount Σ(k) toward the first designated direction of the occupant riding section 5 reduces (refer to the two-dot chain line (t=t0–t1) in FIG. 10 ($a$)). Thus, such an event is avoided that Vdep_x becomes excessively large while the occupant riding section 5 tilts toward the first designated direction. Therefore, such an event can be prevented or suppressed that when the tilting direction of the occupant riding section 5 shifts from the first designated direction to the second designated direction, the vehicle 1 is translated toward the second designated direction at such a high speed that the user does not expect (refer to the two-dot chain line and the solid line (t=t1) in FIG. 10 ($a$)).

Vdep_x is determined so as to reduce after completion of tilting toward the first designated direction of the occupant riding section 5 (refer to the two-dot chain line (t=t1–t5) in FIG. 10 ($a$)). Thus, after the tilting direction of the occupant riding section 5 shifts from the first designated direction to another direction such as the second designated direction, reduction of Vdep_x that remains at the time of shifting of the tilting direction is made quicker. As a result, the motion condition of translation and the like toward the second designated direction of the vehicle 1 matching the intention of the user according to the tilting condition of the occupant riding section 5 can be achieved quickly.

The case where the basic speed command Vjs_x is 0 means that, at the time t=t3 when the vehicle 1 starts translation toward the second designated direction (forward direction), Vofs_x+Vdep_x becomes large enough so as to depart from a dead zone of the processing unit 32c to the positive side, and such Vb_cmd_x that translates the vehicle 1 to the forward direction is generated.

The accumulation value Σ(k) according to the tilting amount toward the first designated direction of the occupant riding section 5 is controlled so as to become the threshold value Σ_th or less. For example, in the second example, Vdep_x determined by tilting toward the first designated direction of the occupant riding section 5 is controlled to the threshold value Kdep2×Σ_th or less (refer to the two-dot chain line (t=t2–t4) in FIG. 10 (b)). Thus, such event is avoided that Vofs_x toward the first designated direction is corrected excessively even though probability that the user intends to translate the vehicle 1 toward the first designated direction in view of the tilting condition of the occupant riding section 5 is high, and therefore the translation can be allowed (refer to the leftward arrow in FIG. 11 (b)).

The case where the basic speed command Vjs_x is 0 means that, at the time t=t4 when the vehicle 1 starts translation toward the first designated direction (rearward direction), Vofs_x+Vdep_x becomes large enough so as to depart from a dead zone of the processing unit 32c to the negative side, and such Vb_cmd_x that translates the vehicle 1 to the rearward direction is generated.

Vb_cmd_x is determined by subjecting the result obtained by correcting Vofs_x by Vdep_x to multi-stage limiting processing having a dead zone in the processing unit 32c of the gravity center target speed determination unit 32 (refer to FIG. 4). Thus, such an event can be avoided more surely that Vofs_x after the correction becomes unstable and the vehicle 1 is translated in an unexpected form.

Second Embodiment and Third Embodiment

Next, the second embodiment and the third embodiment of the present invention will be described respectively referring to FIG. 9 (a), FIG. 9 (b). Also, the second embodiment and the third embodiment are different from the first embodiment with respect to only a part of processing of the second control processing unit 25. Therefore, in description of the second embodiment and the third embodiment, description of items same as those of the first embodiment will be omitted.

Also, in FIGS. 9 (a) and 9 (b), the reference signs in parentheses relate to the modifications described below.

Figure 9:
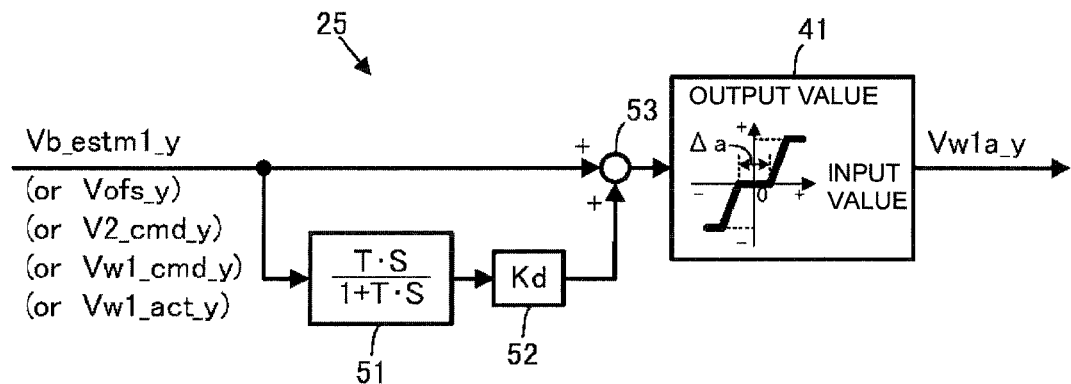
FIG. 9 (a) is a block diagram showing processing of an essential part of the second control processing unit in the second embodiment of the present invention.
Figure 9:
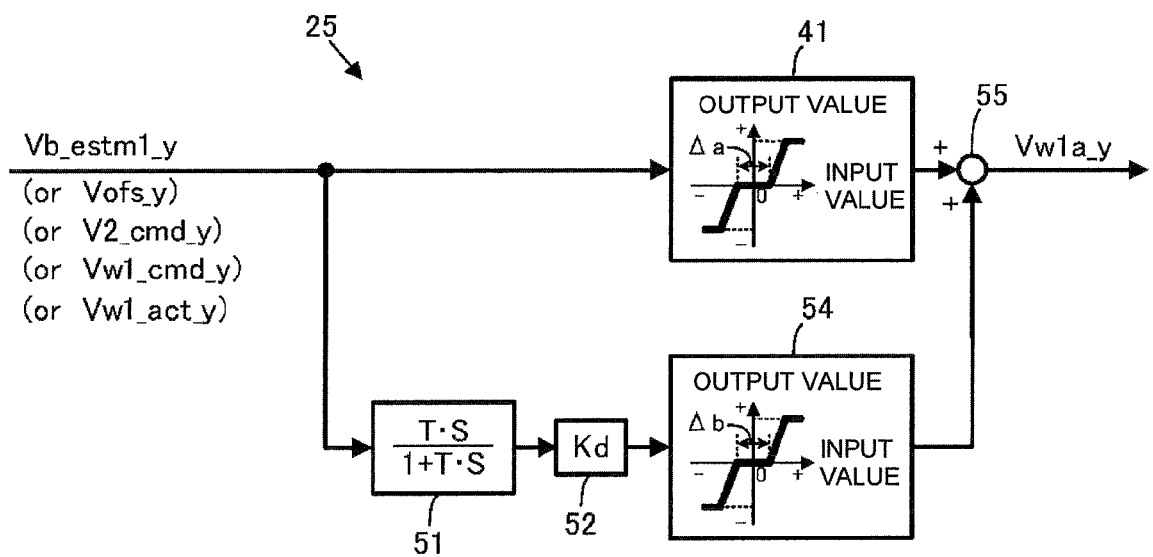

FIG. 9 (a) shows processing in which the second control processing unit 25 determines Vw1a_y (the target value of the speed after dead zone processing) according to the estimate value Vb_estm1_y of the moving speed in the Y-axis direction of the vehicle system entirety gravity center in the second embodiment.

In this second embodiment, the second control processing unit 25 includes a low-cut filter (pseudo-differentiation filter) 51 to which the estimate value Vb_estm1_y of the moving speed in the Y-axis direction of the vehicle system entirety gravity center is inputted. The second control processing unit 25 adds a value obtained by multiplying the output of the low-cut filter 51 (a value obtained by subjecting Vb_estm1_y to filtering processing of a low-cut characteristic) by the gain Kd of a predetermined value by a processing unit 52 to Vb_estm1_y by a calculation unit 53.

Also, the second control processing unit 25 inputs the output of the calculation unit 53 to the processing unit 41 same as that of the first embodiment instead of inputting Vb_estm1_y, executes processing of the processing unit 41 in a similar manner as done in the first embodiment, and thereby determines Vw1a_y. That is, Vw1a_y is equivalent to one obtained by passing Vb_estm1_y through a phase compensation circuit (filter).

The second embodiment is the same as the first embodiment with respect to the items other than those described above.

In such second embodiment, Vw1a_y and the target turning angular velocity ωz_cmd_gc are determined according to the phase compensation value of the estimate value Vb_estm1_y of the moving speed in the Y-axis direction of the vehicle system entirety gravity center (the output of the calculation unit 53) and the output of the low-cut filter 51 which becomes one according to the temporal change rate thereof.

Therefore, response of the turning behavior of the vehicle 1 can be improved with respect to movement in the Y-axis direction of the vehicle system entirety gravity center accompanying movement of the upper body of the occupant.

Next, FIG. 9 (b) shows processing in which the second control processing unit 25 determines Vw1a_y (the target value of the speed after dead zone processing) according to the estimate value Vb_estm1_y of the moving speed in the Y-axis direction of the vehicle system entirety gravity center in the third embodiment.

In this third embodiment, similarly to the first embodiment, the estimate value Vb_estm1_y of the moving speed in the Y-axis direction of the vehicle system entirety gravity center is configured to be inputted to the processing unit 41.

Also, in the third embodiment, in addition to including the low-cut filter 51 and the processing unit 52 which are the same as those of the second embodiment, the second control processing unit 25 further includes a processing unit 54 that inputs the output of the processing unit 52. This processing unit 54 executes processing similar to that of the processing unit 41.

More specifically, when the absolute value of the input value of the processing unit 54 is comparatively small and the input value is a value within a predetermined range Ab with zero taken in the center (when the absolute value of the input value is equal to or less than a predetermined value determined beforehand), the processing unit 54 makes the output value zero.

Also, when the absolute value of the input value of the processing unit 54 is comparatively large and the input value is a value out of the predetermined range b (when the absolute value of the input value is larger than the predetermined value determined beforehand), the processing unit 54 sets the output value to a value that is not zero.

More specifically, the processing unit 54 determines the output value according to the input value of the processing unit 54 so that the absolute value of the output value thereof increases accompanying increase of the absolute value of the input value of the processing unit 54 in the range of a predetermined upper limit value or less. In this case, the polarity (direction) of the output value of the processing unit 54 is made same as that of the input value.

Also, the second control processing unit 25 in the third embodiment determines Vw1a_y by adding the output value of the processing unit 41 and the output value of the processing unit 54 by a calculation unit 55.

The third embodiment is the same as the first embodiment with respect to the items other than those described above.

In the third embodiment, Vw1a_y is determined by adding a component determined by the processing unit 41 according to the estimate value Vb_estm1_y of the moving speed in the Y-axis direction of the vehicle system entirety gravity center and a component determined by the processing unit 54 according to the output of the low-cut filter 51 which becomes one according to the temporal change rate of Vb_estm1_y.

Therefore, similarly to the second embodiment, response of the turning behavior of the vehicle 1 can be improved with respect to movement in the Y-axis direction of the vehicle system entirety gravity center accompanying movement of the upper body of the occupant.

On Modifications

Next, some of modifications of the respective embodiments described above will be described.

In the embodiments, the X-axis negative direction (rearward direction) was defined as "the first designated direction", and the X-axis positive direction (forward direction) was defined as "the second designated direction". Alternatively or additionally, it is also possible that a direction different from the X-axis negative direction is defined as "the first designated direction", and a direction different from the X-axis positive direction is defined as "the second designated direction".

For example, it is also possible that the Y-axis negative direction (rightward direction) is defined as "the first designated direction" and the Y-axis positive direction (leftward direction) is defined as "the second designated direction". In this case, such an event can be suppressed or prevented that the vehicle 1 is translated leftward contrary to the intention of the user when the base 2 tilts leftward at the initial stage of riding because the user rides on the occupant riding section 5 from the left side of the vehicle 1.

In the embodiments, the gravity center shift correction amount Vdep_x was determined according to the expression (3c) or (3d), however, as another embodiment, the gravity center shift correction amount Vdep_x may be determined by making either one or both of ωb_act_xy and θb_act_xy expressing the tilting condition of the base 2 a main variable and according to an optional function or a subordinate variable f having an optional combination including (characteristic 1) out of the following (characteristic 1)-(characteristic 4) as a variation characteristic. Thus, the gravity center shift correction amount Vdep_x can be determined so as to have the variation characteristic shown in FIG. 10 (*a*) and FIG. 10 (*b*).

(Characteristic 1) As the tilting amount toward the first designated direction of the base 2 increases, the gravity center shift correction amount Vdep_xy with respect to the second designated direction increases continuously or intermittently.

(Characteristic 2) The increase rate of the gravity center shift correction amount (Vdep_x) with respect to the second designated direction with respect to the tilting amount toward the first designated direction of the base 2 reduces.

(Characteristic 3) The gravity center shift correction amount Vdep_x with respect to the second designated direction reduces after completion of tilting toward the first designated direction of the base 2.

(Characteristic 4) The gravity center shift correction amount Vdep_x with respect to the second designated direction is adjusted so as to become a threshold value or less.

The gravity center shift correction amount Vdep_x may be determined so as to have only (characteristic 1) and (characteristic 4) by setting the value of Kdep1 to a value of 1 or more (1 for example) in the expression (3c) or (3d). Also, the gravity center shift correction amount Vdep_x may be determined so as to have only (characteristic 1) by omitting the threshold value.

The control device 21 (or the first control processing unit 24) may be configured to adjust the reduction rate of Vdep_x according to the motion condition of the vehicle 1 after completion of tilting toward the first designated direction of the base 2 (refer to t=t1 in FIG. 10 (*a*) and the single-dot chain line in FIG. 11 (*a*)). More specifically, the reduction rate of Vdep_x may be adjusted so as to increase intermittently or continuously as the translational speed or the turning speed of the vehicle 1 increases after completion of tilting toward the first designated direction of the base 2.

For example, in the first example, as shown by the broken line in FIG. 10 (*a*), the reduction rate of Vdep_x (refer to the two-dot chain line) is adjusted so as to be high at the time t=t3 and onward, the time t3 being the time when the vehicle 1 starts translation forward. Thus, the state of Vdep_x=0 that is the state where Vofs_x is inputted to the gravity center target speed determination unit 32 as it is, is achieved early. Therefore, consistency of the steering intention of the user to translate the vehicle 1 toward the first designated direction and the motion condition of the vehicle 1 is achieved early.

The control device 21 may be configured so as to lower the steering sensitivity of the vehicle 1 in the warming up period from start of the vehicle 1 until a constant time elapses compared to that in the normal operation period thereafter. In order to lower the steering sensitivity of the vehicle 1, for example, the dead zone of the processing unit 32*c* (refer to FIG. 4) of the gravity center target speed determination unit 32 forming the first control processing unit 24 is widened temporarily in the warming up period. Thus, the situation that the vehicle 1 starts to move in the warming up period can be avoided.

The control device 21 may be configured so as to lower the steering sensitivity of the vehicle 1 intermittently or continuously when abnormality is detected in the vehicle 1. Thus, such situation is avoided that the damage increases because the vehicle 1 is still used continuously even if abnormality occurs in the vehicle 1. The control device 21 may be configured so as to display presence/absence of abnormality detection or the kind of abnormality on the indicator or to make a speaker output the same by sound.

As the abnormality, a system error such as noise-originated communication abnormality of the control device 21, significant drop of the storage quantity of the on-vehicle battery, overheat of a constituting component of the vehicle 1, excessive supply current to electric equipment that is a constituting component of the vehicle 1, and the like can be cited. In order to lower the steering sensitivity of the vehicle 1, for example, at least one of a limit value in the X-axis direction and the Y-axis direction of the processing unit 32*e* of the gravity center target speed determination unit 32 (refer to FIG. 4) forming the first control processing unit 24 and a limit value in the Y-axis direction of the processing unit 41 (refer to FIG. 8) forming the second control processing unit 25 is adjusted so as to gradually approach 0 after abnormality detection.

The control device 21 may be configured so as to raise the steering sensitivity of the vehicle 1 so as to approach the initial steering sensitivity according to state change after abnormality detection of the vehicle 1. Thus, movement of the vehicle 1 to the maintenance location and the like after occurrence of abnormality becomes possible or easy.

For example, when the event that the user gets down from the occupant riding section 5 is detected after drop of the storage quantity of the battery is detected, the steering sensitivity of the vehicle 1 may be raised. When the event that the temperature of a constituting component of the vehicle 1 has dropped to a normal temperature is confirmed after overheat of the constituting component is detected, the steering sensitivity of the vehicle 1 may be raised. When the event that the supply current to a constituting component of the vehicle 1 has restored to a normal value is confirmed after excessive supply current to the constituting component of the vehicle 1 is detected, the steering sensitivity of the vehicle 1 may be raised.

In the respective embodiments, in processing of the second control processing unit 25, as an indicator for determining presence/absence of the turning request or the degree of the turning request, the estimate value Vb_estm1_y of the moving speed in the Y-axis direction of the vehicle system entirety gravity center calculated by the gravity center speed estimation unit 33 was used. However, as an indicator for determining presence/absence of the turning request or the degree of the turning request, a parameter other than Vb_estm1_y may be used.

For example, as shown in the reference signs in parentheses of FIG. 8 or FIG. 9 (a), (b), the target turning angular velocity ωz_cmd_gc of the vehicle 1 may be determined by executing processing of the processing units 41, 42 similarly to the embodiments using, instead of Vb_estm1_y, the gravity center shift effect amount Vofs_y in the Y-axis direction (or the gravity center shift amount estimate value Ofst_estm_xy) calculated by the gravity center shift effect amount calculation unit 35b of the first control processing unit 24, or the post-restriction speed command V2_cmd_y in the Y-axis direction determined by the processing unit 32e, or the first target speed Vw1_cmd_y in the Y-axis direction of the first moving motion unit 3 determined by the attitude control calculation unit 34, or the observed value of the actual moving speed Vw1_act_y in the Y-axis direction of the first moving motion unit 3 (for example, a value of Vw1_act_y estimated from the detection value of the rotational speed of the electric motor 8b).

Also, in this case, in the processing unit 41, the range Δa (the magnitude of the upper limit value and the lower limit value of the range Δa) of a value of an input parameter making the output value of the processing unit 41 zero and the change ratio of the output value with respect to change of a value of the input parameter outside the range Δa are set for each input parameter of each kind in general. This is similar in the processing unit 54 shown in FIG. 9 (b).

Even when such parameters as described above which substitutes for Vb_estm1_y are used, similarly to the embodiments, the vehicle 1 can be turned according to movement in the right/left direction of the upper body of the occupant.

Here, when the gravity center shift effect amount Vofs_y in the Y-axis direction calculated by the gravity center shift effect amount calculation unit 35b of the first control processing unit 24 is used instead of Vb_estm1_y, the Vofs_y is proportionate to the gravity center shift amount estimate value Ofst_estm_y in the Y-axis direction, and therefore, to set the target turning angular velocity ωz_cmd_gc of the vehicle 1 according to Vofs_y is equivalent to setting the target turning angular velocity ωz_cmd_gc of the vehicle 1 according to the gravity center shift amount estimate value Ofst_estm_y in the Y-axis direction.

Also, in the respective embodiments, the distance L3 between the center of turning and the grounding part of the first moving motion unit 3 when the vehicle 1 turned was changed according to the estimate value (observed value) Vb_estm_x of the moving speed in the front/rear direction of the vehicle system entirety gravity center, however, L3 may be a constant value determined beforehand.

Further, in the first embodiment, the target turning angular velocity ωz_cmd_gc was set to zero when the estimate value Vb_estm1_y of the moving speed in the Y-axis direction of the vehicle system entirety gravity center as the input parameter of the processing unit 41 was a value within a predetermined range Δa in the vicinity of zero, however, even when the input parameter is a value within the predetermined range Δa, the target turning angular velocity ωz_cmd_gc may be set so as to turn the vehicle 1. That is, Δa may be made zero.

Also, in the respective embodiments, one in which the second moving motion unit 4 was disposed on the rear side of the first moving motion unit 3 was shown, however, the second moving motion unit 4 may be disposed on the front side of the first moving motion unit 3. In the case, by making the moving speed in the Y-axis direction of the second moving motion unit 4 higher than the moving speed in the Y-axis direction of the first moving motion unit 3 in turning, the vehicle 1 can be turned.

In the respective embodiments, the joy stick 12 was used as an operation tool for outputting the advancing/retreating command and the transverse moving command, however, a track ball and a touch pad may be used instead of the joy stick, or otherwise, a load sensor detecting the contact position by the occupant, an attitude sensor held by the occupant, and the like may be used. Also, a portable terminal such as a smart phone for example can be used as the operation tool.

Further, the operation tool such as the joy stick 12 and the like may be omitted, or otherwise, an operation tool that outputs only the advancing/retreating command may be provided.

Also, the second moving motion unit 4 may have a structure other than the omni-wheel, or may have a structure similar to that of the first moving motion unit 3 for example.

Also, it may be configured to be capable of selecting to turn the vehicle 1 by that the occupant moves the body of the occupant himself or herself in the right/left direction by operation of a selection switch and the like by the occupant, and to turn the vehicle 1 by operation of an operation tool such as a joy stick by the occupant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverted pendulum type vehicle comprising:
   moving motion units configured to be capable of moving in all directions on a floor surface;
   actuator devices that drive the moving motion units;
   a base that incorporates the moving motion units and the actuator devices;
   an occupant riding section incorporated into the base so as to be tiltable with respect to an imaginary line that extends orthogonally with respect to the floor surface;
   a tilting state detection unit that detects a tilting state of the occupant riding section; and
   a control device configured to control a motion of the actuator devices based on a detection result of the tilting state of the occupant riding section by the tilting state detection unit,
   wherein the control device is configured to control the motion of the actuator devices, so that the vehicle is translated in a second designated direction that is the opposite direction of a first designated direction of the occupant riding section at a speed determined based on a tilting condition in a designated tilting posture of the occupant riding section defined in the first designated direction with respect to a reference tilting posture of the occupant riding section under a condition wherein the inverted pendulum type vehicle is halted.

2. The inverted pendulum type vehicle according to claim 1, wherein the control device is configured to determine a basic translation command value of the vehicle toward a tilting direction of the occupant riding section based on the tilting condition of the occupant riding section, to determine a translation command correction amount toward the second designated direction of the vehicle based on the tilting condition toward the first designated direction of the occupant riding section, and to determine a translational speed of the vehicle based on a result obtained by correcting the basic translation command value according to the translation command correction amount.

3. The inverted pendulum type vehicle according to claim 2, wherein the control device is configured to determine the translation command correction amount so that the translation command correction amount of the vehicle with respect to the second designated direction continuously or intermittently increases as a tilting amount toward the first designated direction of the occupant riding section increases.

4. The inverted pendulum type vehicle according to claim 3, wherein the control device is configured to determine the translation command correction amount of the vehicle so that the translation command correction amount with respect to the second designated direction reduces after completion of tilting of the occupant riding section toward the first designated direction.

5. The inverted pendulum type vehicle according to claim 3, wherein the control device is configured to determine the translation command correction amount of the vehicle so that an increased rate of the translation command correction amount with respect to the second designated direction reduces with respect to the tilting amount toward the first designated direction of the occupant riding section.

6. The inverted pendulum type vehicle according to claim 5, wherein the control device is configured to determine the translation command correction amount of the vehicle so that the translation command correction amount with respect to the second designated direction reduces after completion of tilting of the occupant riding section toward the first designated direction.

7. The inverted pendulum type vehicle according to claim 2, wherein the control device is configured to determine the translation command correction amount of the vehicle so that the translation command correction amount with respect to the second designated direction reduces after completion of tilting of the occupant riding section toward the first designated direction.

8. The inverted pendulum type vehicle according to claim 7, wherein the control device is configured to adjust a reduction rate of the translation command correction amount based on a motion condition of the vehicle after completion of the tilting of the occupant riding section toward the first designated direction.

9. The inverted pendulum type vehicle according to claim 8, wherein the control device is configured to adjust the reduction rate of the translation command correction amount so that the reduction rate continuously or intermittently increases as the translational speed or a turning speed of the vehicle increases after completion of the tilting of the occupant riding section toward the first designated direction.

10. The inverted pendulum type vehicle according to claim 9, wherein the control device is configured to determine the translation command correction amount of the vehicle so that the translation command correction amount with respect to the second designated direction becomes a threshold value.

11. The inverted pendulum type vehicle according to claim 10, wherein the control device is configured to determine the translational speed of the vehicle by subjecting a result obtained by correcting the basic translation command value according to the translation command correction amount to multi-stage limiting processing having a dead zone.

12. The inverted pendulum type vehicle according to claim 2, wherein the control device is configured to determine the translational speed of the vehicle by subjecting a result obtained by correcting the basic translation command value according to the translation command correction amount to multi-stage limiting processing having a dead zone.

13. The inverted pendulum type vehicle according to claim 2, wherein the control device is configured to determine the translation command correction amount of the vehicle so that the translation command correction amount with respect to the second designated direction becomes a threshold value.

14. An inverted pendulum type vehicle comprising:
moving motion units configured to be capable of moving in all directions on a floor surface;
actuator devices that drive the moving motion units;
a base that incorporates the moving motion units and the actuator devices;
an occupant riding section incorporated into the base so as to be tiltable with respect to an imaginary line that extends orthogonally with respect to the floor surface;
a tilting state detection unit that detects a tilting state of the occupant riding section; and
a control device configured to control a motion of the actuator devices based on a detection result of the tilting state of the occupant riding section by the tilting state detection unit,
wherein the control device is configured to control the motion of the actuator devices, so that the vehicle is translated in a second designated direction that is the opposite direction of a first designated direction of the occupant riding section at a speed determined based on a tilting condition toward the first designated direction of the occupant riding section;
wherein the control device is configured to determine a basic translation command value of the vehicle toward a tilting direction of the occupant riding section based on the tilting condition of the occupant riding section, to determine a translation command correction amount toward the second designated direction of the vehicle based on the tilting condition toward the first designated direction of the occupant riding section, and to determine a translational speed of the vehicle based on a result obtained by correcting the basic translation command value according to the translation command correction amount, wherein the control device is configured to adjust a reduction rate of the translation command correction amount so that the reduction rate continuously or intermittently increases as the translational speed or a turning speed of the vehicle increases after completion of tilting of the occupant riding section toward the first designated direction.

15. The inverted pendulum type vehicle according to claim 14, wherein the control device is configured to determine the translation command correction amount of the vehicle so that the translation command correction amount with respect to the second designated direction becomes a threshold value.

16. The inverted pendulum type vehicle according to claim 14, wherein the control device is configured to determine the translation command correction amount so that the translation command correction amount of the vehicle with respect to the second designated direction continuously or intermittently increases as a tilting amount toward the first designated direction of the occupant riding section increases.

17. The inverted pendulum type vehicle according to claim 16, wherein the control device is configured to determine the translation command correction amount of the vehicle so that an increased rate of the translation command correction amount with respect to the second designated direction reduces with respect to the tilting amount toward the first designated direction of the occupant riding section.

18. The inverted pendulum type vehicle according to claim 14, wherein the control device is configured to determine the translation command correction amount of the vehicle so that the translation command correction amount with respect to the second designated direction reduces after completion of tilting of the occupant riding section toward the first designated direction.

* * * * *